(12) United States Patent
Kurosawa et al.

(10) Patent No.: US 6,654,060 B1
(45) Date of Patent: *Nov. 25, 2003

(54) VIDEO-IMAGE CONTROL APPARATUS AND METHOD AND STORAGE MEDIUM

(75) Inventors: Takahiro Kurosawa, Kunitachi (JP); Kenichiro Tanaka, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,394

(22) Filed: Dec. 22, 1997

(30) Foreign Application Priority Data

| Jan. 7, 1997 | (JP) | 9-000755 |
| Jun. 4, 1997 | (JP) | 9-146583 |
| Sep. 30, 1997 | (JP) | 9-267274 |

(51) Int. Cl.[7] .......................... H04N 5/222; H04N 7/18; H04N 5/232; H04N 5/262

(52) U.S. Cl. ............... 348/333.02; 348/143; 348/14.04; 348/211.8; 348/239; 348/159

(58) Field of Search .......................... 348/333.01–333.12, 348/143, 14.02, 14.04, 14.05, 14.07, 14.08, 211.3, 211.8, 211.11, 211.12, 239, 159, 157; 364/550

(56) References Cited

U.S. PATENT DOCUMENTS

| 5,182,641 A | * | 1/1993 | Diner et al. | 348/159 |
| 5,305,100 A | * | 4/1994 | Choi | 348/159 |
| 5,400,068 A | * | 3/1995 | Ishida et al. | 348/14.04 |
| 5,638,114 A | * | 6/1997 | Hatanaka et al. | 348/14.09 |
| 5,742,521 A | * | 4/1998 | Ellenby et al. | 702/127 |
| 5,815,411 A | * | 9/1998 | Ellenby et al. | 702/150 |
| 6,037,936 A | * | 3/2000 | Ellenby et al. | 348/211 |
| 6,122,005 A | * | 9/2000 | Sasaki et al. | 348/211 |
| 6,266,082 B1 | * | 7/2001 | Yonezawa et al. | 348/14.02 |

FOREIGN PATENT DOCUMENTS

| JP | 06165186 A | * | 6/1994 | H04N/7/18 |
| JP | 07046581 A | * | 2/1995 | H04N/7/18 |
| JP | 07212748 A | * | 8/1995 | H04N/7/18 |

OTHER PUBLICATIONS

"Beyond the Web: Excavating the Real World Via Mosaic", Goldberg et al., Oct. 21, 1994.*

U.S. patent application Ser. No. 08/898,197, Sato et al., filed Jul. 22, 1997.

U.S. patent application Ser. No. 08/955,213, Noro et al., filed Oct. 21, 1997.

U.S. patent application Ser. No. 08/965,213, Nakamura et al., filed Nov. 6, 1997.

U.S. patent application Ser. No. 08/975,214, Kohno, filed Nov. 20, 1997.

* cited by examiner

*Primary Examiner*—Wendy R. Garber
*Assistant Examiner*—John M. Villecco
(74) *Attorney, Agent, or Firm*—Morgan & Finnegan, LLP

(57) ABSTRACT

A video-image control apparatus enables a client to obtain the details of an object in a displayed video image. For this purpose, when the angle of a camera 1003 is changed in accordance with an instruction from an external device, it is determined whether or not the object (e.g., a copier) is within an image sensing view. If it is determined that the object is within the image sensing view, the current status of the object is obtained by request. Then, an image of a character string indicative of the status information is generated, and combined with the video image. The combined image is transferred via a communication interface unit to the external device.

11 Claims, 31 Drawing Sheets

FIG.3

| IMAGE-SENSING TIME | ACCEPTANCE CODE | IMAGE-SENSING CONDITION | IMAGE FORMAT |
|---|---|---|---|
| 1996.7.6.13.15 | 12543 | P25T0Z3 | gif |

FIG.4

| ACCEPTANCE CODE | IMAGE FORMAT | IMAGE DATA |
|---|---|---|
| 12543 | gif | 0100011101001001...... |

FIG.6

| IMAGE-SENSING TIME | END TIME | INTERVAL TIME | ACCEPTANCE CODE | IMAGE-SENSING CONDITION | IMAGE FORMAT |
|---|---|---|---|---|---|
| 1996.7.6.13.15 | 1996.7.6.13.45 | 15 | 12543 | P25T0Z3 | gif |

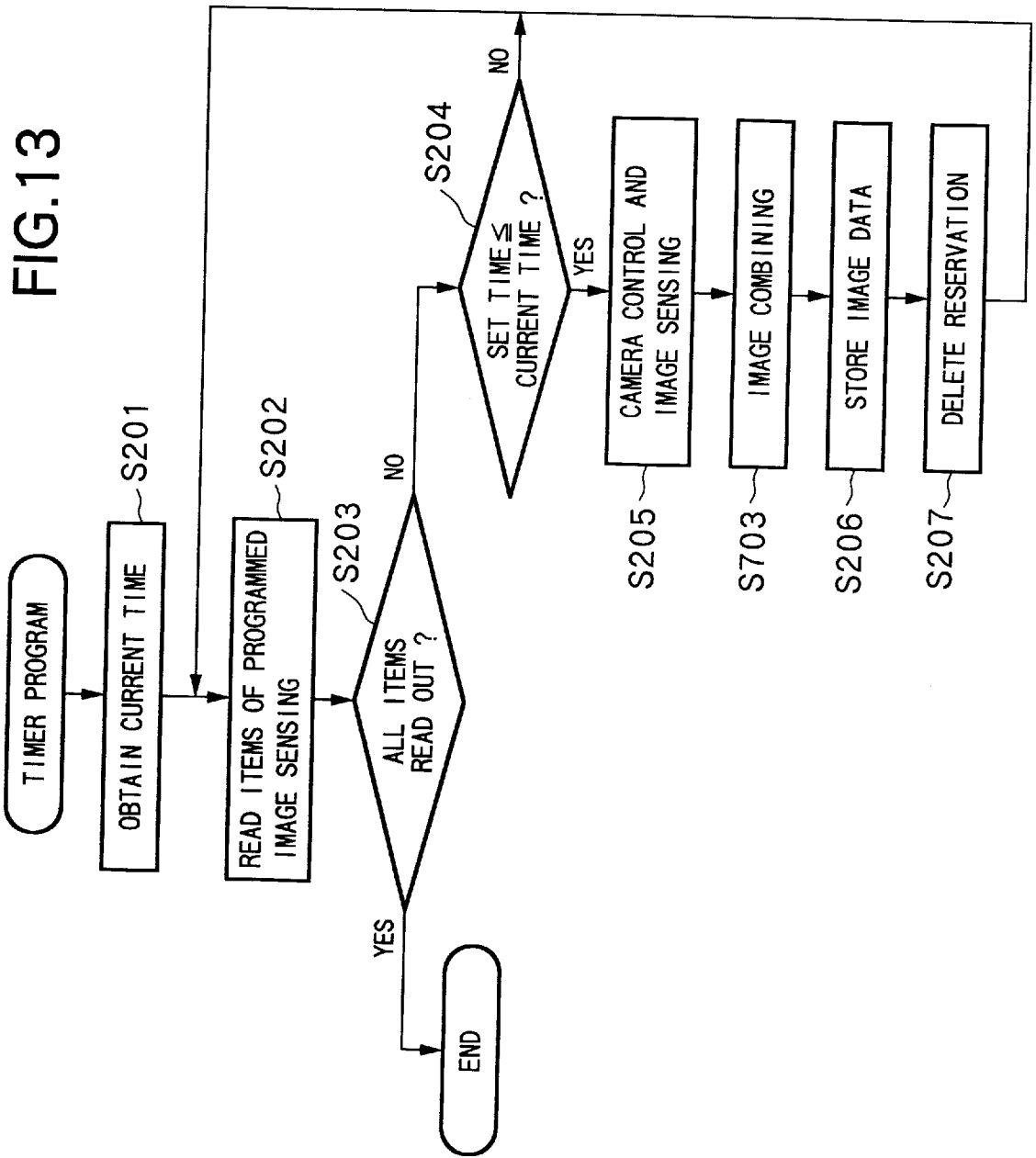

FIG.15

MANAGEMENT TABLE

| [OBJECT OF MANAGEMENT] | [ABSOLUTE COORDINATES] | [SIZE] |
|---|---|---|
| printer#231 | 4F(north), <300, 450, 100> | <30, 80, 75> |
| colorprinter#5 | 4F(north), <300, 500, 100> | <50, 80, 75> |
| psprinter#172 | 4F(north), <300, 600, 100> | <20, 80, 75> |
| facsimile#19 | 4F(north), <1300, 500, 100> | <120, 160, 100> |
| copier#102 | 4F(north), <1300, 600, 10> | <120, 160, 100> |
| copier#445 | 4F(south), <1310, 100, 10> | <120, 130, 100> |
| facsimile#28 | 4F(south), <1310, 200, 100> | <120, 160, 100> |
| colorprinter#4 | 4F(south), <1350, 550, 100> | <50, 80, 75> |
| printer#266 | 4F(south), <1830, 400, 100> | <30, 80, 75> |

FIG.16

MANAGEMENT TABLE

| [OBJECT OF MANAGEMENT] | [ABSOLUTE COORDINATES] | [SIZE] | [ANNOTATION] |
|---|---|---|---|
| printer#231 | 4F(north), <300, 450, 100> | <30, 80, 75> | 『commonly used in laboratory : printer(LBP-720)』 |
| colorprinter#5 | 4F(north), <300, 500, 100> | <50, 80, 75> | 『commonly used in laboratory : colorprinter(LBP-2030)』 |
| psprinter#172 | 4F(north), <300, 600, 100> | <20, 80, 75> | 『commonly used in laboratory : postscript printer(PS-320)』 |
| facsimile#19 | 4F(north), <1300, 500, 100> | <120, 160, 100> | 『commonly used in laboratory : facsimile apparatus(549-5455)』 |
| copier#102 | 4F(north), <1300, 600, 10> | <120, 160, 100> | 『commonly used in laboratory : copier(NP-7090)』 |
| copier#445 | 4F(south), <1310, 100, 10> | <120, 130, 100> | 『second video image planning section : copier(NP-9130)』 |
| facsimile#28 | 4F(south), <1310, 200, 100> | <120, 160, 100> | 『second video image planning section : facsimile apparatus(549-5111)』 |
| colorprinter#4 | 4F(south), <1350, 550, 100> | <50, 80, 75> | 『second video image planning section : colorprinter(LBP-2030)』 |
| printer#266 | 4F(south), <1830, 400, 100> | <30, 80, 75> | 『second video image planning section : printer(LBP-720)』 |

FIG.17

MANAGEMENT TABLE

| [STAFF] | [ABSOLUTE COORDINATES] | [CURRENT POSITION] | [CAMERA] |
|---|---|---|---|
| kurosawa | 4F(north), <300, 450, 10> | meeting room 191 | camera#249 |
| arai | 4F(north), <300, 500, 10> | (present) | camera#122 |
| sakai | 4F(north), <300, 600, 10> | meeting room 191 | camera#249 |
| saeki | 4F(north), <1300, 500, 10> | meeting room 191 | camera#249 |
| toujou | 4F(north), <1300, 600, 10> | parlor 311 | (none) |
| fujii | 4F(south), <1310, 100, 10> | library | camera#84 |
| shindo | 4F(south), <1310, 200, 10> | (present) | camera#122 |
| kanda | 4F(south), <1350, 550, 10> | (present) | camera#122 |
| watanabe | 4F(south), <1830, 400, 10> | laboratory 26F(north) | camera#58 |

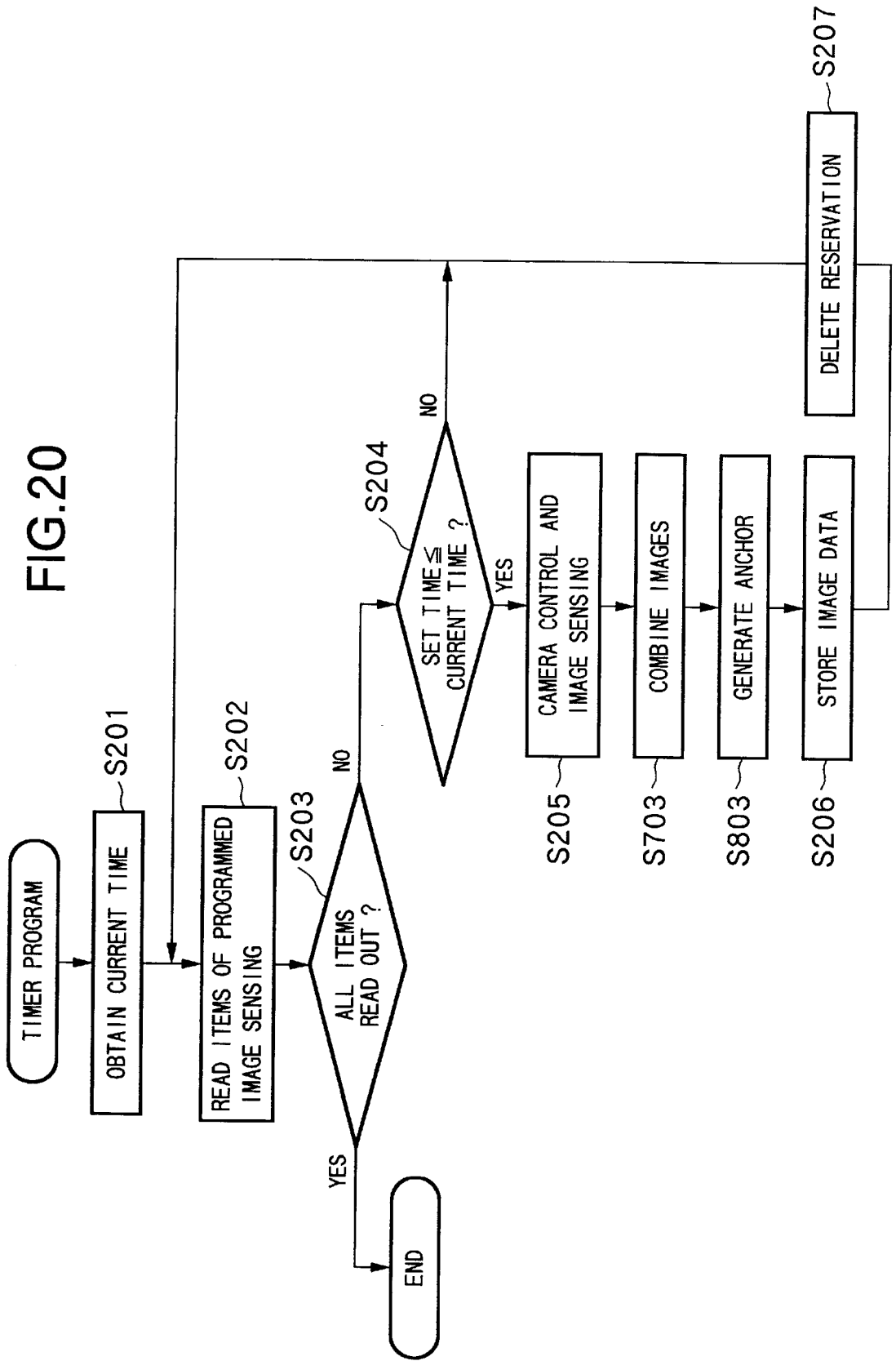

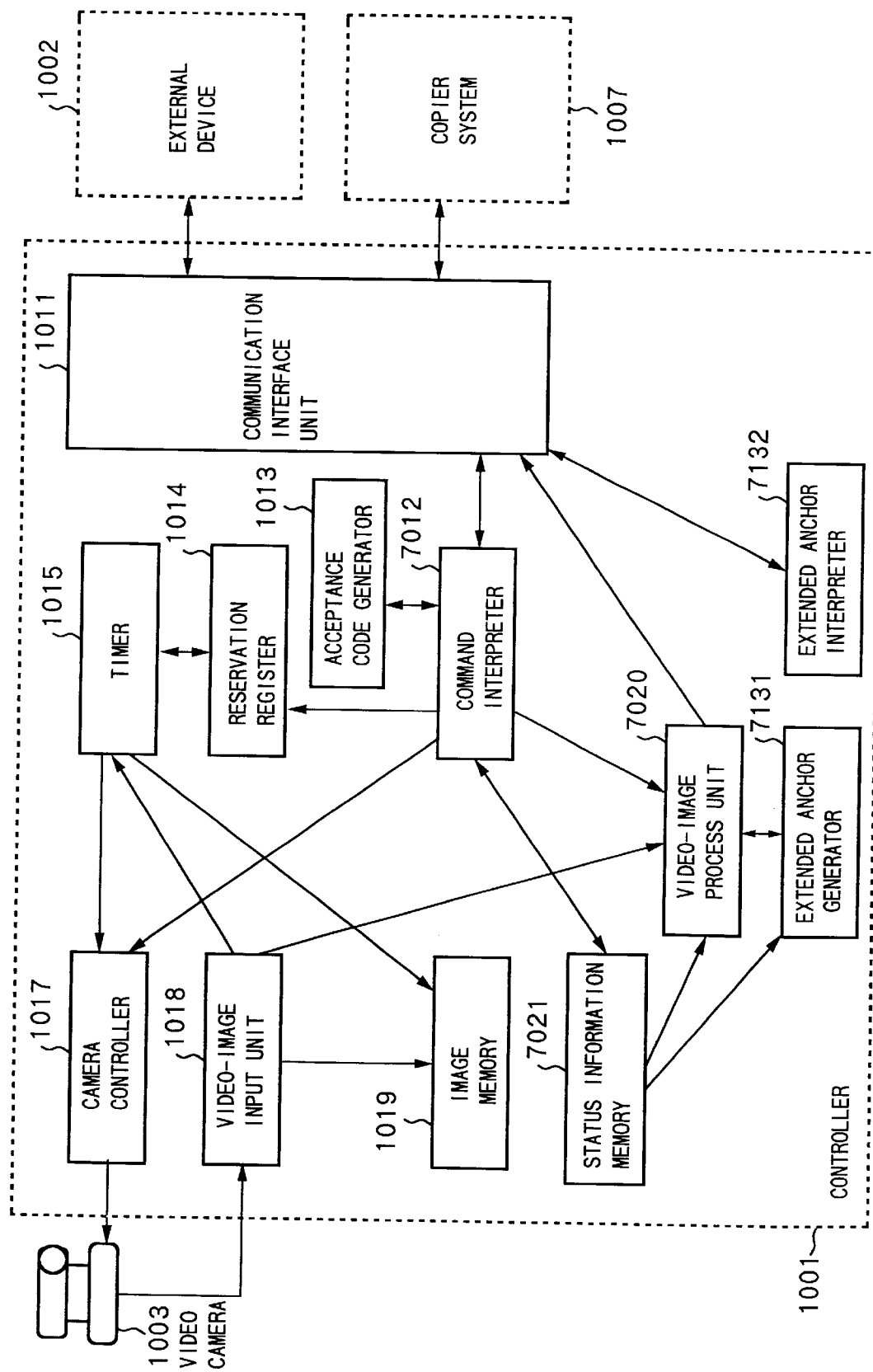

FIG.23

| [OBJECT OF MANAGEMENT] | [ABSOLUTE COORDINATES] | [SIZE] | [URL] |
|---|---|---|---|
| printer_231 | 4F(north), <300, 450, 10> | <30, 80, 75> | http://www.foo.co.jp/netdevices/printer/printer_231/snmp.html |
| colorprinter_5 | 4F(north), <300, 500, 100> | <50, 80, 75> | http://www.foo.co.jp/netdevices/colorprinter_5/snmp.html |
| psprinter_172 | 4F(north), <300, 600, 100> | <20, 80, 75> | http://www.foo.co.jp/netdevices/psprinter_172/snmp.html |
| facsimile_19 | 4F(north), <1300, 500, 100> | <120, 160, 100> | http://www.foo.co.jp/netdevices/facsimile_19/snmp.html |
| copier_102 | 4F(north), <1300, 600, 10> | <120, 160, 100> | http://www.foo.co.jp/netdevices/copier_102/snmp.html |
| copier_445 | 4F(south), <1310, 100, 10> | <120, 130, 100> | http://www.foo.co.jp/netdevices/copier_445/snmp.html |
| facsimile_28 | 4F(south), <1310, 200, 100> | <120, 160, 100> | http://www.foo.co.jp/netdevices/facsimile_28/snmp.html |
| colorprinter_4 | 4F(south), <1350, 550, 100> | <50, 80, 75> | http://www.foo.co.jp/netdevices/colorprinter_4/snmp.html |
| printer_266 | 4F(south), <1830, 400, 100> | <30, 80, 75> | http://www.foo.co.jp/netdevices/printer_266/snmp.html |

FIG.24

| MANUFACTURED BY ABC COMPANY | S/N XXXXXX |
|---|---|
| RESIDUAL TONER AMOUNT    OK ||
| NUMBER OF COPIES    XXXXXX ||
| PRINT SHEET    A4:OK<br>A3:EMPTY ||
| ADDRESS IN CASE OF EMERGENCY:<br>TOKYO, OHTA-KU, ...<br><br>Tel 03-XXXX-XXXX<br>FAX 03-XXXX-XXXX<br><br>ENGINEER:MR. SUZUKI ||

FIG.29
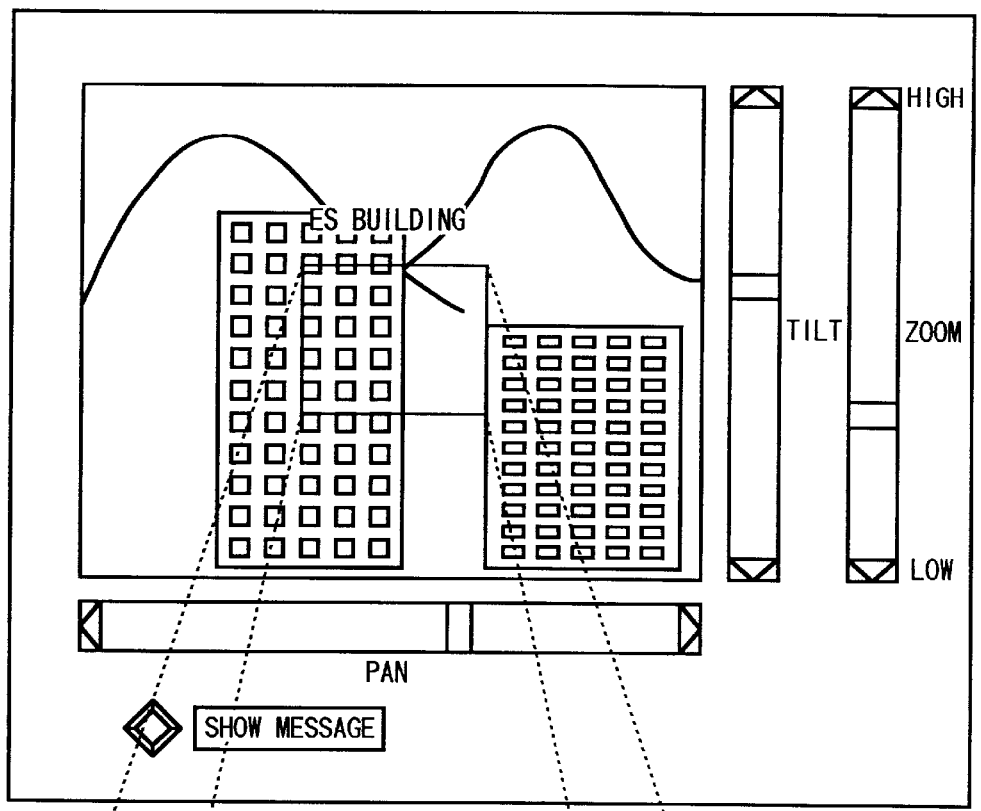
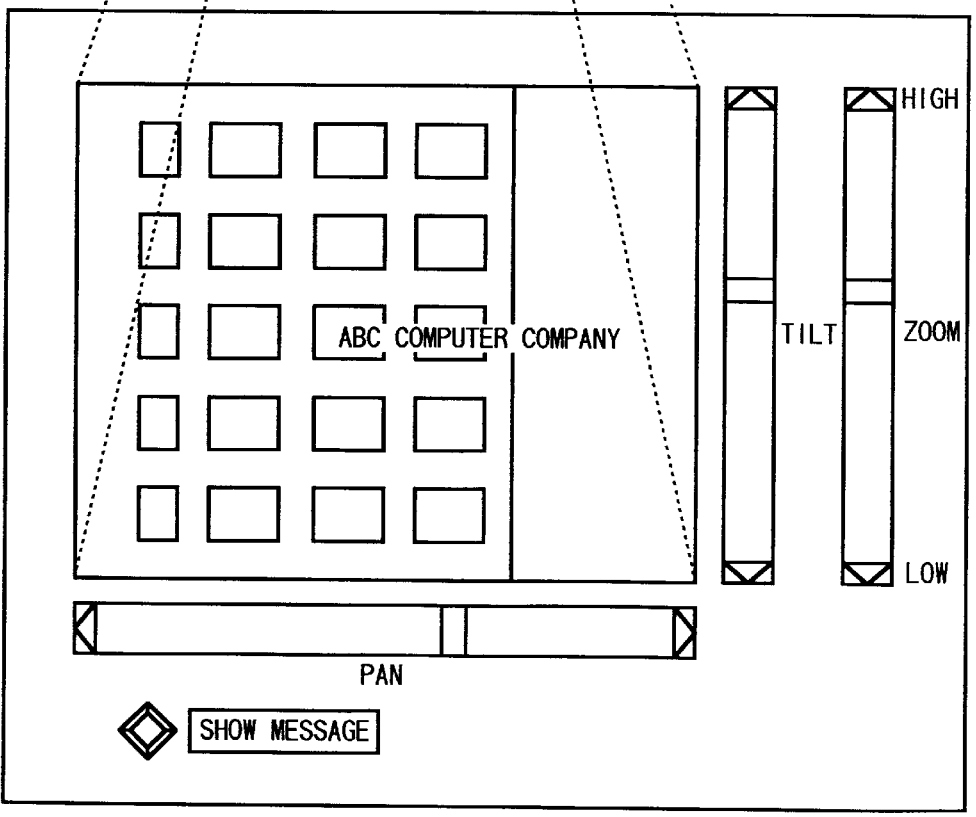

VIDEO-IMAGE CONTROL APPARATUS AND METHOD AND STORAGE MEDIUM

BACKGROUND OF THE INVENTION

This invention relates to video control apparatus and method and a storage medium, and more particularly, to video control apparatus and method and a storage medium for transferring an input video image, obtained in accordance with a request from a remote client, to the client.

The assignee of the present invention has already filed several systems where a client can obtain a video image by connecting with a remote camera server (device which controls a camera and transfers an obtained video image to a client) via an existing network.

The camera server uses a general-purpose device such as a personal computer and a work station. A card (or board) having a video capture function is attached to the device, and a video camera is connected to the card. Further, to control the camera angle (e.g., panning, tilting and zooming) of the video camera at the camera server by the client, the assignee of the present invention has proposed a system where a camera device, placed on a predetermined panhead, has a variable zoom value, and a signal to control the camera angle is outputted from the camera server main body to the camera device via a predetermined interface (e.g., a serial interface generally included by a personal computer).

On the other hand, the client also comprises a general device such as a personal computer and a work station.

In the above systems, it is possible to confirm a video image obtained by a remote camera, however, regarding respective displayed objects in the video image, information other than the video image of the objects cannot be obtained.

SUMMARY OF THE INVENTION

To solve the above problem, the present invention provides a video-image control apparatus having video-image input means, which transfers a video image, inputted in accordance with a request from a remote client, to the client, comprising: generating means for generating an additional image based on pre-stored information corresponding to an object in the video image inputted by the video-image input means; combining means for combining the additional image generated by the generating means, with the video image inputted by the video-image input means; and transfer means for transferring an image obtained from combining by the combining means, to the client.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of a data format of information generated by a reservation register in FIG. 4;

FIG. 4 is a table showing an example of a management format of data stored in an image memory in FIG. 1;

FIG. 6 is a table showing an example of a data format of information generated by the reservation register according to a third example of the presuppositional part of the embodiments;

FIG. 13 is a flowchart showing a process procedure of the timer in FIG. 11;

FIG. 15 is an example of a management table according to the first embodiment;

FIG. 16 is a modified example of the management table according to the first embodiment;

FIG. 17 is an example of the management table according to a second embodiment;

FIG. 20 is a flowchart showing a process procedure of the timer in FIG. 18;

FIG. 21 is a block diagram showing the system according to a fourth embodiment;

FIG. 23 is a modified example of the management table of the embodiments;

FIG. 24 is an example of information displayed when an anchor of the embodiments is clicked;

FIG. 29 is an explanatory view showing combination of a video image and a message according to the fifth embodiment;

DETAILED DESCRIPTION OF THE PREFERRED EMBODIMENTS

Prior to description of preferred embodiments of the present invention, a presuppositional part of the embodiments will now be described.

Outline

As described above, the present applicant has proposed systems where a video image obtained by a camera connected to a remote camera server is obtained from a client side via an existing network, and further, the camera angle (pan, tilt, zoom values) of the camera can be controlled from the client side.

One of characteristic features of the systems is that the camera can be controlled by using, not well-known monitor camera or the like, but a general network (the Internet) protocol, and the control is made within the range of the protocol.

Figure 1:
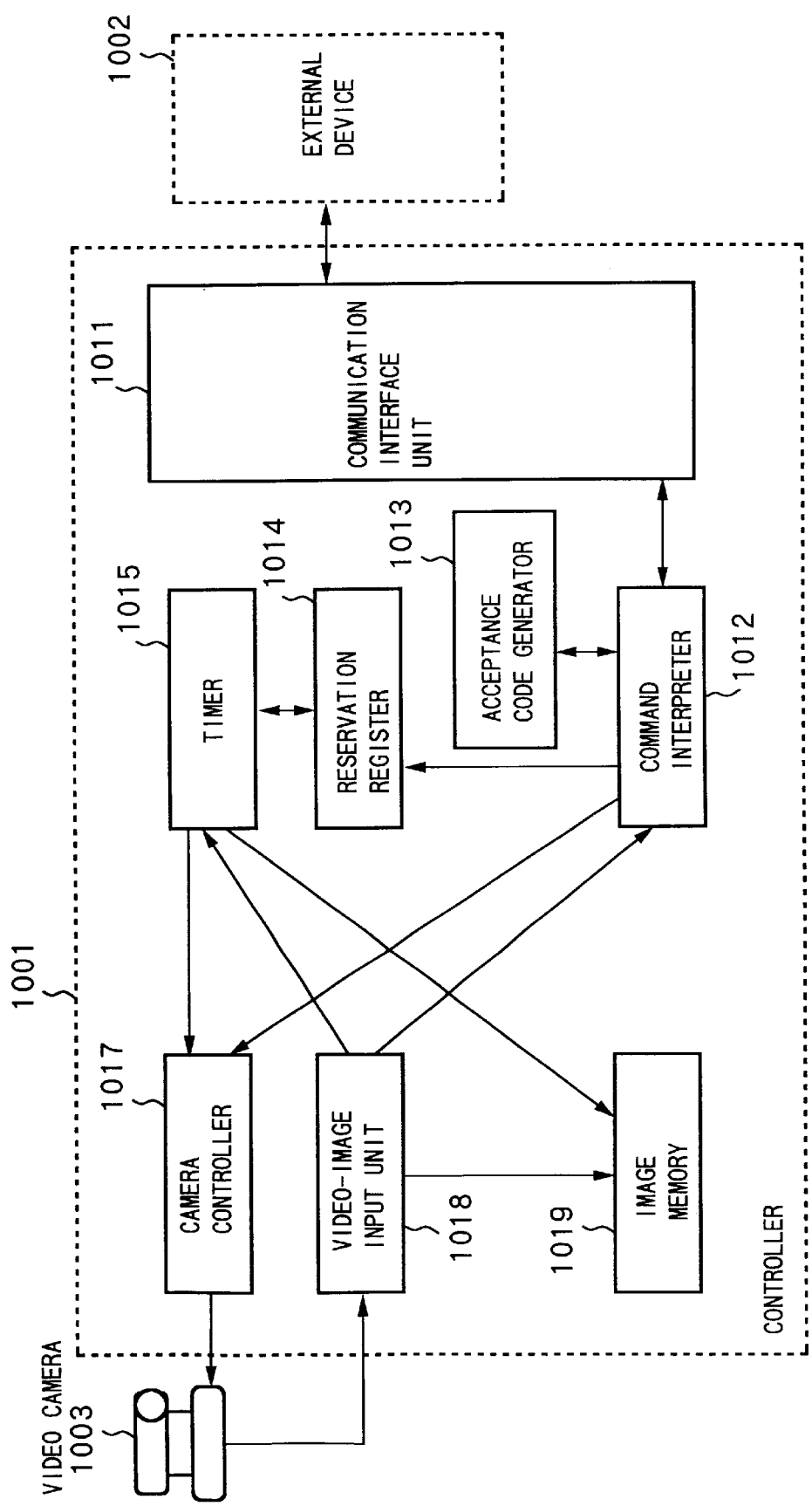
FIG. 1 is a block diagram showing a system as a presuppositional part of the embodiments.

FIG. 1 is a block diagram showing a camera server apparatus. In FIG. 1, reference numeral 1003 denotes a camera in which its camera angle, image sensing condition and the like are controllable; 1001, a controller which controls the camera 1003 in accordance with an instruction from an external device 1002, and sends an obtained video image to the external device 1002. The controller 1001 is realized by comprising a personal computer, for example. The controller 1001 outputs a control signal via RS-232C interface or the like to the camera 1003. The controller 1001 has a camera controller 1017 which controls the camera angle, a video-image input unit 1018 which inputs a video image obtained by the camera 1003 by an image capture device or the like, and a communication interface unit 1011 for information exchange between the apparatus and another apparatus via a network adapter or the like. In addition to these resources, the controller 1001 has the following elements, by realizing them as programs and memory data utilizing respective resources such as a CPU, a memory and an auxiliary storage device of a computer.

That is, the controller 1001 has a command interpreter 1012, an acceptance code generator 1013, a timer 1015, an image memory 1019, and a reservation register 1014 (these elements will be described in detail below).

The external device 1002 is a WWW server or a WWW browser, for example. If the external device 1002 is a WWW server, the present apparatus is managed by the WWW server, and the WWW browser sends a request, in accordance with a URL (Uniform Resource Locator) indicating the storage destination of desired data, to a WWW server which is a storage of document data and image data. In response to the request, the WWW server returns corresponding document data or image data to the WWW browser.

If the external device 1002 is a WWW browser, the function of the above WWW server is included in the present apparatus.

For the sake of simplicity of explanation, the external device 1002 is a WWW client here. Communication is performed among the devices by the HTTP protocol, and the camera control apparatus 1001 behaves as if it is a WWW server in video data application. This is possible by applying the WWW server's communication method to the present control apparatus.

Generally, when image data is pasted in a WWW document, the request command is described as follows:

<img src="http://www.foo.co.jp/image001.gif">

(A character string in quotation marks " " is described as a single string without any line-feed/new paragraph mark.)

This means that it is requested to transfer image data stored in a file "image001.gif" in a WWW server "www-.foo.co.jp". In this example, the file name part is interpreted as a command.

As an example, camera-angle destination such as panning, tilting and zooming are represented by alphabets "P", "T" and "Z" respectively, then, respective control amounts are represented by numerical values. For example, assuming that the server has a camera having a pan angle from −50° to 50°, a tilt angle from −20° to 20° and 1 to 8 times zooming, when image sensing is performed with a pan angle of 20°, a tilt angle of 5° and twice zooming, and the obtained image is pasted (transferred) as "gif" format image data, the description is as follows. Note that the network address of the present camera control apparatus is "www.foo.co.jp".

<img src="http://www.foo.co.jp/P20T5Z2.gif">

In this case, the WWW browser, external device 1002, outputs the above character string in HTML (HyperText Markup Language) requires the camera control apparatus 1001 to provide the image data. More specifically, when this request enters the camera control apparatus 1001 via the communication interface unit 1011, the command interpreter 1012 is activated to start interpretation of the request and processing for a response to the request.

Figure 2:
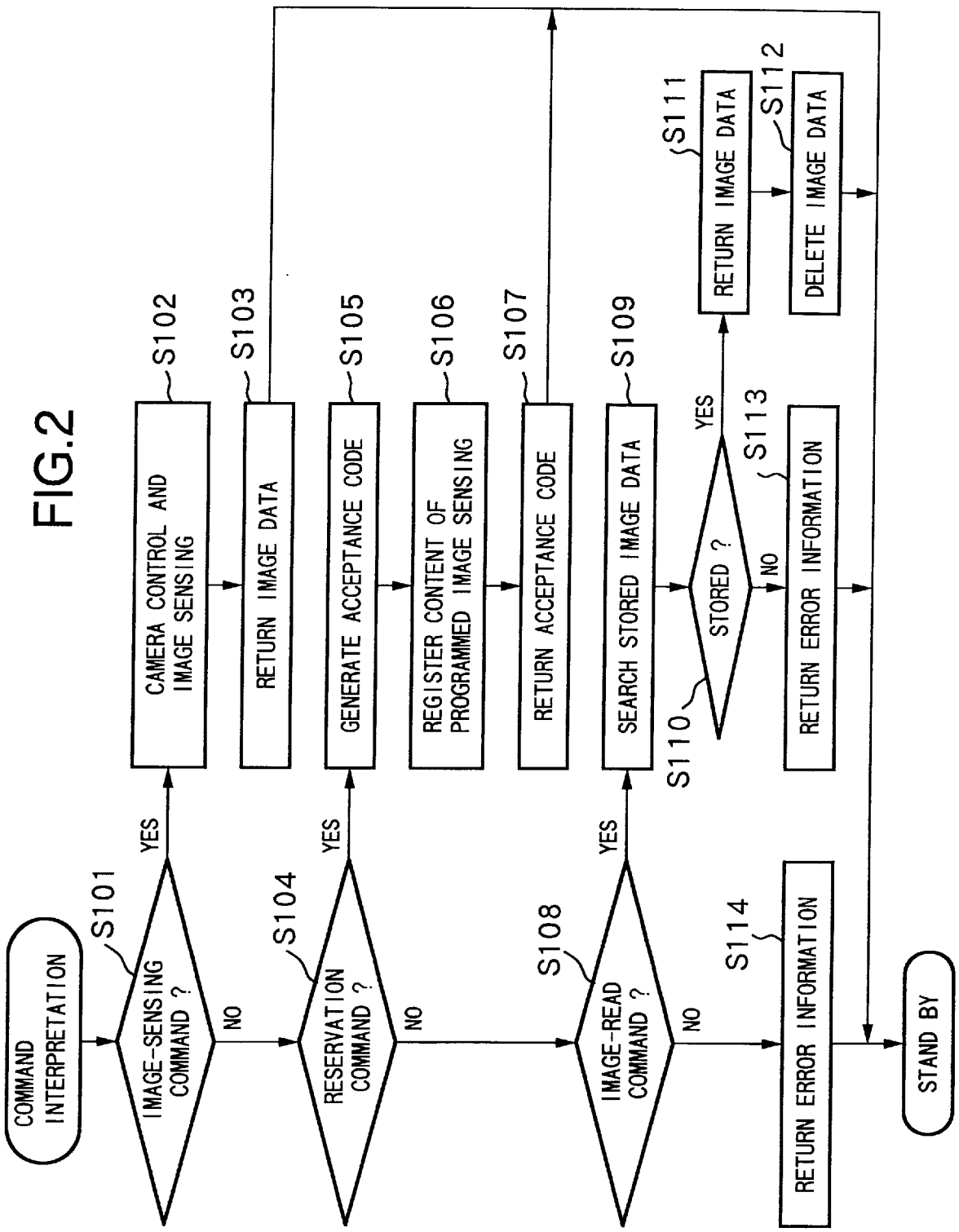
FIG. 2 is a flowchart showing a process procedure of a command interpreter in FIG. 1.

FIG. 2 is a flowchart showing an example of the processing.

First, at step S101, the command described as a file name is interpreted. That is, if the head of the request is "P", the command is recognized as an image-sensing command, then process proceeds to step S102. At this step, the camera 1003 is controlled via the camera controller 1017 based on the designated pan, tilt and zoom values (step S102). The obtained image is converted into data of the designated image format, then sent to the external device 1002 requiring the image data, via the communication interface unit 1011.

At this time, as the communication interface unit 1011 uses the HTTP protocol, content-type information and status information corresponding to the image format are added to the head of the image data. Then, the process ends.

Thus, the obtained video image is pasted in the HTML document as if it is image data stored in a file in the WWW server.

In the command interpretation at step S101, if the head of the request is "R", the command is recognized as a reservation command. Then, the process proceeds to step S105 via the determination of image-sensing condition at step S104.

The reservation command is used for a service to make reservation of image sensing, and later transfer an obtained video image to a client. The reservation command starts with "R"; then it continues with integers indicating year, month, day, hour, and minute, each terminated with a period, and with designation of panning, tilting and zooming as image-sensing condition; finally it ends with a name indicating the image format.

For example, if video-image sensing is programmed with image-sensing time of 13:15 on Jul. 6, 1996, a pan angle of 25°, a tilt angle of 0° and a 3 times zooming, in gif format, the reservation is described as follows:

<img src="http://www.foo.co.jp/R1996.7.6.13.15P25T0Z3.gif">

When the above reservation command is designated, the camera server transfers a unique identification number as an acceptance code from the acceptance code generator 1013 to the external device 1002, at step S105. The external device 1002 that has received the acceptance code can obtain a video image obtained by image sensing based on the above reservation later. The acceptance code may be a count value which is incremented by one (+1) at each request generated, or may be a numerical value indicating the designated time (year, month, date and time).

Then, the acceptance code, the image-sensing time, the image-sensing condition and the image format are registered into the reservation register 1014 (step S106). The acceptance code is returned via the communication interface unit 1011 to the external device 1002 which issued the reservation command (step S107).

Note that at this time, content-type information and status information, indicating that the response is an acceptance code, are added to the head of the code. Then the process ends.

However, if an HTML document including such image-sensing reservation is simply generated but a general WWW browser is used to display the obtained image, the acceptance code instead of image data is returned and an image is not displayed. However, if image-sensing is reserved with respect to the camera control apparatus 1001 by using a CGI program or the like of the WWW server, in the same manner as that in the WWW browser, and after an acceptance code has been obtained, an HTML document is generated with image-data description designating the acceptance code by an image read command to be described later, image sensing can be performed as programmed when the document is displayed by the WWW browser, and the image data can be displayed.

Note that the image read command starts with alphabet "G", then continues with the acceptance code, and ends with the extension indicating the image format. The acceptance code is returned to the external device 1002 upon reservation.

For example, if "12543" is returned as an acceptance code, to read the image obtained by programmed image sensing, the following description is used:

<img src="http://www.foo.co.jp/G123543.gif">

The reservation register 1014 is stored in the format of a table, for example, as shown in FIG. 3, into a memory device of the controller 1001 or the auxiliary storage device. For example, in the above reservation, when the acceptance code is "12543", the contents of the reservation is described as the first row of the table in FIG. 3.

When the reservation has been registered, image sensing as programmed is performed at the image sensing time, based on the timer to be described later. The image data is stored in the image memory 1019.

The image memory 1019 is realized in the format as shown in FIG. 4, for example, in the memory device of the controller 1001 or the auxiliary storage device (e.g., a hard disk). For example, the result of image sensing by the above reservation is recorded, as image data of the designated format, with the acceptance code and image format information, in the first row of the table in FIG. 4.

In the command interpretation at step S101, if the head of the command is "G", it is determined that the command is an image read command. The process proceeds via determination at steps S104 to S108 to step S109, at which data stored in the image memory 1019 is searched.

Then, it is determined whether or not the data obtained by,the above search has the same value of the acceptance code described as the image read command (step S110). If YES, the image data is read, and transferred via the communication interface unit 1011 to the external 1002 requesting the image data.

Also at this time, as the communication interface unit 1011 uses the HTTP protocol, content-type information and status information corresponding to the image format are added to the head of the image data (step S111). At step S112, the image data in the storage area of the image memory 1019, from which the image data has been read out, is deleted. Then the process ends.

If it is determined at step S110 that image data corresponding to the designated acceptance code is not stored, error information indicating that the programmed image sensing has not been performed is returned via the communication interface unit 1011 to the external device 1002 requesting the image data. Then the process ends.

Further, if it determined at step S108 that the head of the command from the external device 1002 is not "G", error information indicating that the command is an undefined command is returned via the communication interface unit 1011 to the external device 1002 requesting the image. Then the process ends.

As described above, information exchange is performed between the external device 1002 and the camera control apparatus 1001 of the present embodiment.

Next, the timer 1015, used for performing camera control and storing the result of image-sensing, based on reservation data registered in the reservation register 1014, will be described.

Figure 5:
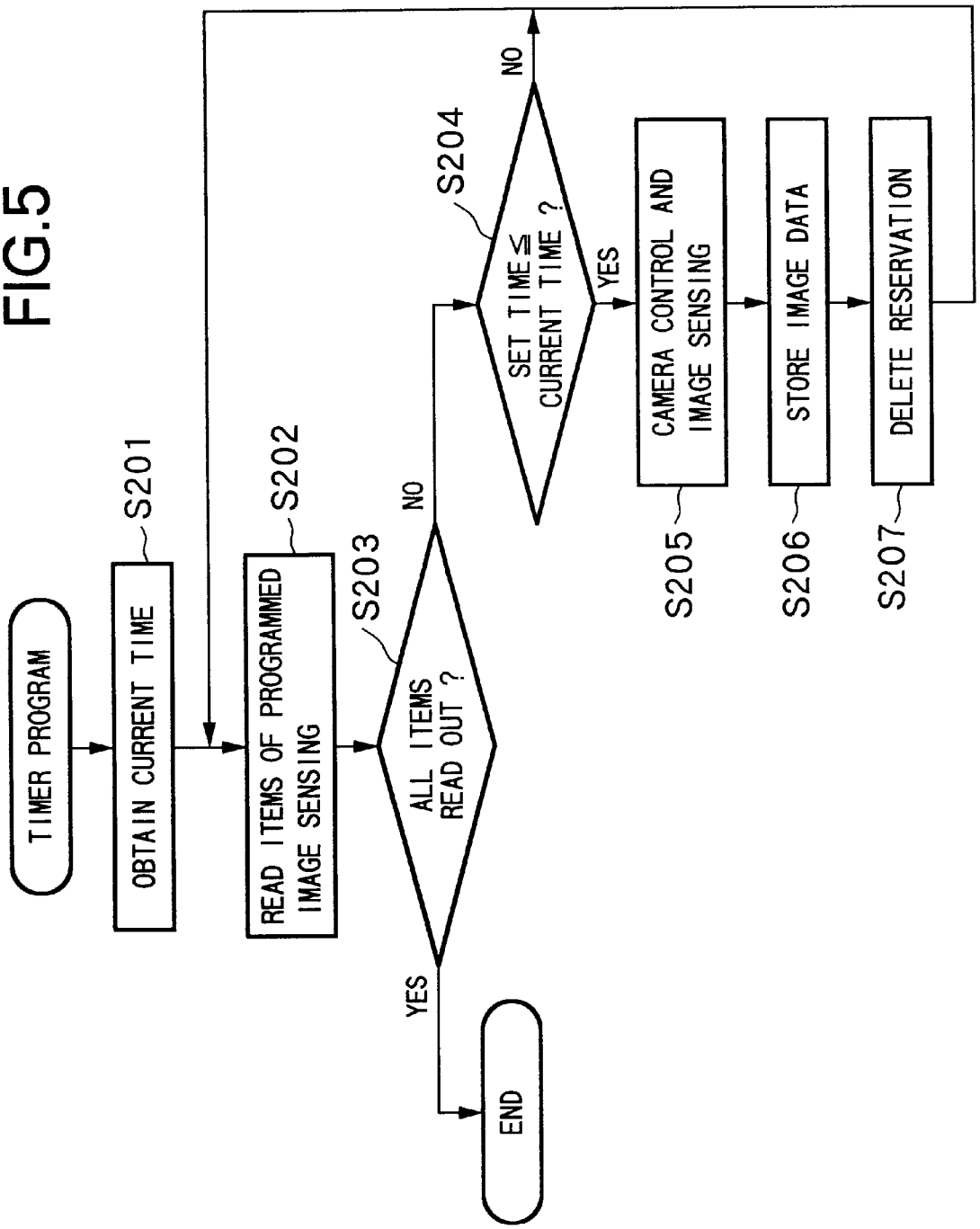
FIG. 5 is a flowchart showing a process procedure of a timer in FIG. 1.

In the timer 1015, at intervals of a predetermined period, e.g., one minute, a timer program is activated. This program is realized by utilizing a timer of a computer or the like. The operation of the timer program will be described with reference to the flowchart of FIG. 5.

First, the current time is read from a timer of the camera control apparatus 1001 (step S201), and the process proceeds to step S202. At step S202, reserved contents, i.e., items of programmed image sensing sequentially registered in a respective columns of the table of the storage device are read from the reservation register 1014. When it is determined at step S203 that all the items of programmed image sensing have been read out, the process ends, otherwise, the process proceeds to step S204. At step S204, if it is determined that the designated time in the reserved data is in the future, the process returns to step S202 to repeat the processing. On the other hand, if it is determined at step S204 that the designated time has come, the process proceeds to step S205, at which the camera 1003 is controlled to perform image sensing, by the camera controller 1017, in accordance with the image-sensing condition of the items of the programmed image sensing read from the reservation register 1014. Then, the obtained image is converted into image data of the image format designated by a corresponding item of the programmed image sensing. The image data is stored, with an acceptance code and image format information, into the image memory 1019 (step S206). Next, the read items of programmed image sensing are deleted from the reservation register 1014 (step S207), and the process returns to step S202 to repeat the processing.

In this manner, image sensing is performed as programmed, and the result of the image sensing is stored. Thereafter, when an image read command is sent from the external device 1002, the image data is returned in response to the command.

As described above, a live image (i.e., current video image) obtained by controlling a remote camera can be easily pasted in a WWW document by connecting the camera control apparatus to a network of the WWW system, and describing a URL where description of image-sensing condition is added to the address of the camera control apparatus, as the source of the image data. Note that if only pasting the image data in a WWW document is performed, the acceptance code generator 1013, the timer 1015, the image memory 1019 and the reservation register 1014 are unnecessary, and step S104 and the subsequent steps of the processing by the command interpreter 1012 are unnecessary.

Further, by providing the timer 1015, the image memory 1019 and the reservation register 1014, programmed image sensing can be reserved, and later the result of image sensing can be taken into a WWW page and the image can be displayed in the WWW page, by utilizing a CGI program of a WWW server or the like. Especially, if image sensing is tried by controlling a remote camera when the network is overcrowded, image transfer takes much time and cannot smoothly provides image data. However, according to this construction, image sensing in such time is programmed with specific camera angle for a necessary period, and the programmed image sensing is reserved, thereafter, stored image data can be read when the network becomes less crowded, e.g., at midnight.

Especially, image sensing can be performed plural times with the same camera angle at short intervals regardless of the transmission capacity of the network.

Note that the HTTP protocol is used as the interface between the camera control apparatus 1001 and the external device 1002, however, any other communication interface can be used.

Note that the acceptance code is used to identify sensed image data corresponding to the reservation of programmed image sensing, however, it may be arranged such that, instead of using the acceptance code generator, a unique request code is generated on the external device 1002 side as a part of a reservation command, then the camera control apparatus 1001 identifies the image data by the correspondence between the request code and the external device 1002.

Further, image-sensing time is designated in minute unit, however, it may be designated second or millisecond unit.

In the present embodiment, to indicate the image format, the extension "gif" is employed. It may be arranged such that the image format indicated by the extension "gif" is arbitrarily changed for a JPEG format indicated by an extension "jpg".

Further, the file name is regarded as a command, however, a parameter description of a URL can be utilized. For example, panning, tilting, zooming and image format are respectively set to "25°", "5°", "twice" and "gif", image sensing can be programmed by the following description:

<img src="http://www.foo.co.jp/cameraimage?P=20,T=5,Z=2,F=gif">

Further, a WWW server may be installed into the camera control apparatus of the present embodiment. In this case, for example, a name "camctl.exe" is given to the program of the command interpreter 1012 as a CGI program for the WWW server, and the image sensing can be programmed by the following description:

<img src="http://www.foo.co.jp/cgi-bin/camctl.exe?P=20,T=5,Z=2,F=gif">

SECOND EXAMPLE

In the above first example, programmed image sensing can be reserved for only one image. Next, another example will be described as a construction where a plurality of reservation commands are combined by "+" into a single file name, and a file extension indicating the image format is added to the file name, so as to reserve programmed image sensing with a plurality of image-sensing times and/or a plurality of camera angles.

For example, if image sensing is programmed with image-sensing times of 13:15, 13:30 and 13:45 on Jul. 6, 1996, a pan angle of 25°, a tilt angle of 0°, 3 times zoom ratio, with intention to read three images in "gif" format later, the reservation is described as follows:

<img src="http://www.foo.co.jp/R1996.7.6.13.15P25T0Z3+R1996.7.6.13.30P25T0Z3+R1996.7.6.13.45P25T0Z3.gif">

Note that if the image sensing is performed plural times at the same time or on the same date or at the same camera angle, the corresponding information in the character string may be omitted. For example, the above reservation command may be described as follows:

<img src="http://www.foo.co.jp/R1996.7.6.13.15P25T0Z3+R . . . 30+R . . . 45.gif">

The basic construction of the second embodiment is substantially the same as that of the first embodiment except the following changes.

That is, in the process procedure of the command interpreter 1012, steps S106, S111 and S112 are executed to interpret the command including the above description.

That is, at step S106, the command is not interpreted as one, but as a plurality of reservation codes combined by "+". At step S105, the image-sensing times and image-sensing conditions designated by the respective reservation commands are registered, with the same reservation command and image format information, into the reservation register 1014.

On the other hand, at step S111, a plurality of image data registered with the same reservation code are read out, and the image data are re-formatted into a single image data including a plurality of images, and the image data is returned via the communication interface unit 1011 to the external device 1002 requesting the image data. At this time, as the communication interface unit 1011 uses the HTTP protocol, content-type information and status information corresponding to the image format are added to the head of the image data.

At step S112, the data in the storage areas in the image memory 1019, corresponding to the plurality of read image data, are deleted.

The above construction enables a number of reservations and handles a plurality of image data obtained by the plurality of programmed image sensing as a single image data file comprising a plurality of images, thus unnecessitates management of a plurality of acceptance codes corresponding to the respective images.

Further, if this technique is applied to interval image sensing such as a record of a plant's growth, an image file containing a series of images can be handled as a pseudo moving image.

THIRD EXAMPLE

In the above second example, in case of image sensing at the same camera angle and at fixed intervals, reservation commands must be combined corresponding to the number of image sensings. In the third example, immediately after the designated time, end time and interval time are added, and then image-sensing condition such as a camera angle and the image format are designated. The end time is designated by numerical values following alphabet "t", and the interval time is designated by numerical values following alphabet "e" in minute unit.

For example, in a case where image sensing is programmed with image-sensing time of 13:15, 13:30 and 13:45 (i.e., at 15-minutes intervals) on Jul. 6, 1996, a pan angle of 25°, a tilt angle of 0° and 3 times zooming, with intention to read three images later, the reservation command is described as follows:

<img src="http://www.foo.co.jp/R1996.7.6.13.15t1996.7.6.13.45e15P25T0Z3.gif">

As described above, if the image-sensing date or time are the same, the description of these image-sensing date or time can be omitted. In such case, the reservation command is described as follows:

<img src="http://www.foo.co.jp/R1996.7.6.13.15t . . . 45e15P25T0Z3.gif">

The basic construction of the third example is substantially the same as that of the first example except the following changes.

That is, in the process procedure by the command interpreter 1012, steps S106, S111 and S112 are changed to interpret the above reservation command.

In this case, it is necessary to arrange the table format registered in the reservation register 1014 as shown in FIG. 6. That is, the item of the end time is added to the table as shown in FIG. 6.

At step S106, if the reservation command has end time and interval time, the reservation is registered with the time of reservation as image-sensing time, and with the acceptance code, the image-sensing condition, and the image format, into the reservation register 1014. If the requested reservation command indicates simple reservation without end time and interval time, the image-sensing time is set as the end time, and the interval time is set to "1".

At step S111, a plurality of image data registered having the same acceptance code are read, then re-formatted as a single image data including a plurality of image data, and returned via the communication interface unit 1011 to the external device 1002 requesting the image data. At this time, as the communication interface unit 1011 uses the HTTP protocol, content-type information and status information corresponding to the image format is added to the head of the image data. At step S112, data in the storage areas in the image memory 1019, corresponding to the plurality of read image data, are deleted.

On the other hand, at step S207, the registered reservation information is updated with information obtained by adding the interval time in the read items of the programmed image sensing, and if the updated image-sensing time is behind the end time, the item of the image-sensing time is deleted from the reservation register 2014.

The above construction enables to easily perform interval image sensing by a short reservation command.

Especially, when interval image sensing is performed for a long period, the second example cannot substantially perform the image sensing due to the lengthiness of the reservation command. However, the third example easily performs such image sensing if the memory capacity for storing image data is sufficient.

FOURTH EXAMPLE

The third example reads the result of interval image sensing as a plurality of still image data. Next, a fourth example where the result of interval image sensing is read as moving image data will be described.

Upon reading the result of interval image sensing as moving image data, the file extension is set to "mpg". For example, the reservation command is as follows:

<img src="http://www.foo.co.jp/R1996.7.6.13.15t . . . 45P25T0Z3.mpg">

Figure 7:
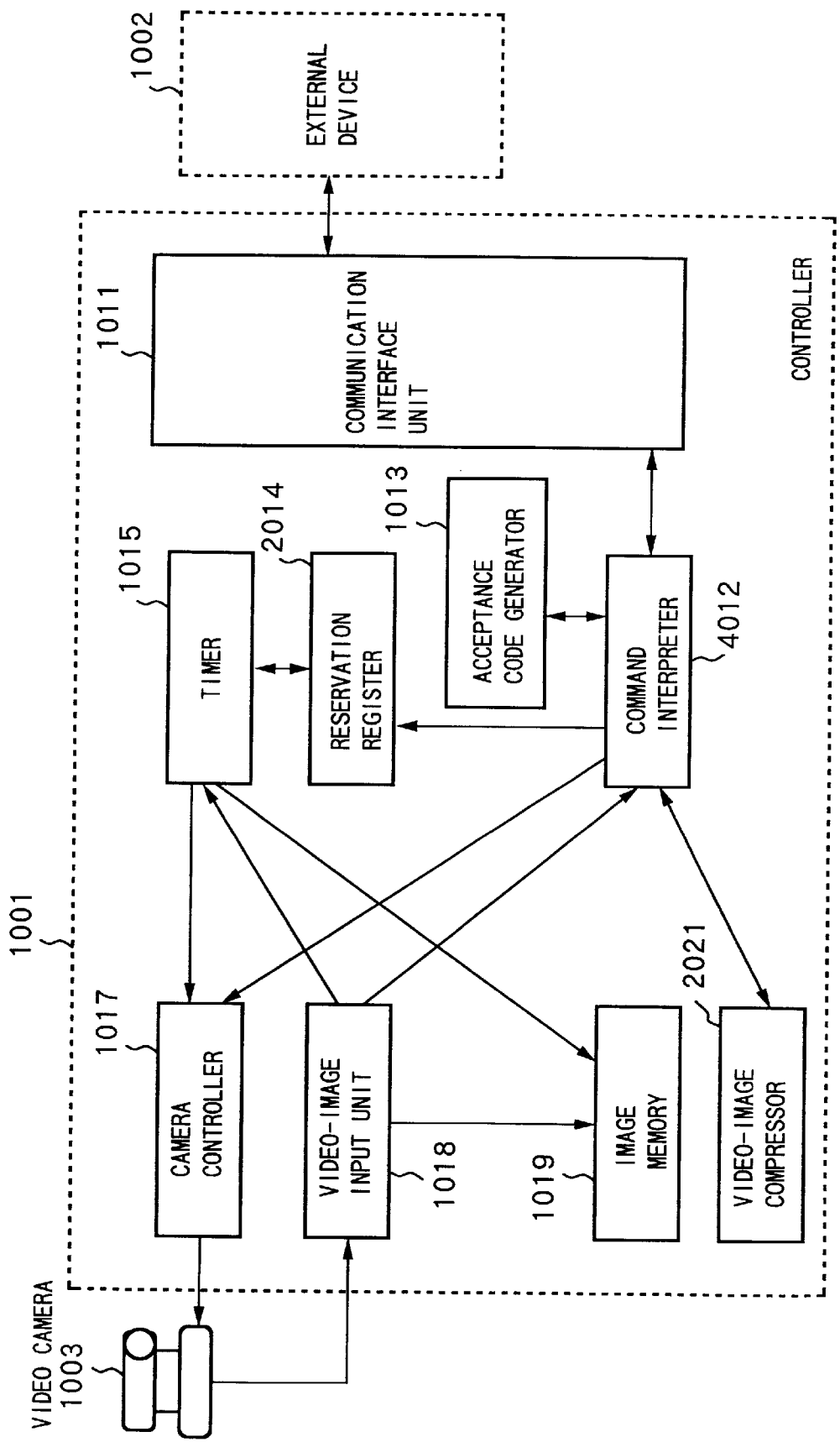
FIG. 7 is a block diagram showing the system according to a fourth example of the presuppositional part of the embodiments.

FIG. 7 shows the basic construction of the camera control apparatus according to the fourth example. The fourth example has substantially the same construction as that of the first example except the following changes. That is, a video-image compressor 2021 such as an MPEG1 compressing unit is added, and the command interpreter 4012 which interprets the above command is provided.

For example, at step S111, if the designated image format is a still image format such as "jpg" or "gif", a plurality of image data registered with the same reservation code are read, then, they are re-formatted into a single image data including a plurality of image data, and the image data is returned via the communication interface unit 1011 to the external device 1002 requesting the image data. If the designated image format is "mpg", a plurality of image data registered with the same reservation code are read and decoded, then the images are compressed by the video-image compressor 2021, and the compressed moving image data are returned via the communication interface unit 1011 to the external device 1002 requesting the image data.

At this time, as the communication interface unit 1011 uses the HTTP protocol, content-type information and status information corresponding to the image format are added to the head of the image data.

The above construction compresses image data by using the relation between image frames, and especially in interval image sensing with slight change, compresses image data by a large data amount. This reduces the amount of communication when the image data are read, thus greatly shortens communication time.

FIFTH EXAMPLE

In the third example, the same camera angle is designated for interval image sensing. Next, a fifth example will be described as a construction where a definition of a control variable is added immediately before the designation of image-sensing time in a reservation command, and then, the image-sensing time, the image-sensing condition such as a camera angle and the image format are designated after the image-sensing time, so as to reserve repetitive image sensing. That is, the reference to the control variable is designated in designation of image-sensing time and image-sensing condition.

The definition of the control variable starts with "$(", and through a definition main body, and ends with ")".

The definition main body is described by two ways of representation. One description is designating an initial value, an end value, and an increment. It is further divided into two descriptions depending on whether the increment is positive or negative. Further, there is another description designating all the values of the control variable:

$(<control variable>=<initial value>,upto<end value>, up<increment>)

$(<control variable>=<initial value>,dowmto<end value>,dowm<increment>) or $(<control variable>=<value 1>,<value 2>,<value 3>,<value4>, . . . <value n>)

Note that <control variable> is a character string, comprising at least one alphabet letter, as an identifier of the control variable.

The reference of the control variable starts with "$(", and through a reference main body, ends with ")". The reference main body is operation using the four arithmetic rules (addition, subtraction, multiplication and division) including the control variable.

For example, if image sensing is programmed with image-sensing time of 13:15 on Jul. 6, 1996, and with pan angle of 25°, tilt angle of 0°, and 3 times zooming,
pan angle of 30°, tilt angle of 0°, and 3 times zooming,
pan angle of 35°, tilt angle of 0°, and 3 times zooming, (In practice, as the angle is changed, there are time-lags between these change of camera angle), and three images in "gif" format are read later, the reservation command is described as follows:

"http://www.foo.co.jp/R$(pan=25,upto35,up5)
   1996.7.6.13.15P$(pan)T0Z3.gif" or
"http://www.foo.co.jp/R$(pan=0,upto10,up5)
   1996.7.6.13.15P$(pan+25)T0Z3.gif" or
"http://www.foo.co.jp/R$(pan=35,downto25,down5)
   1996.7.6.13.15P$(pan)T0Z3.gif" or
"http://www.foo.co.jp/R$(pan=25,30,35)
   1996.7.6.13.15P$(pan)T0Z3.gif"

The basic construction of the fifth example is the same as that of the second example, though it differs from the second example in that the command interpreter 1012 interprets the above description.

Figure 8:
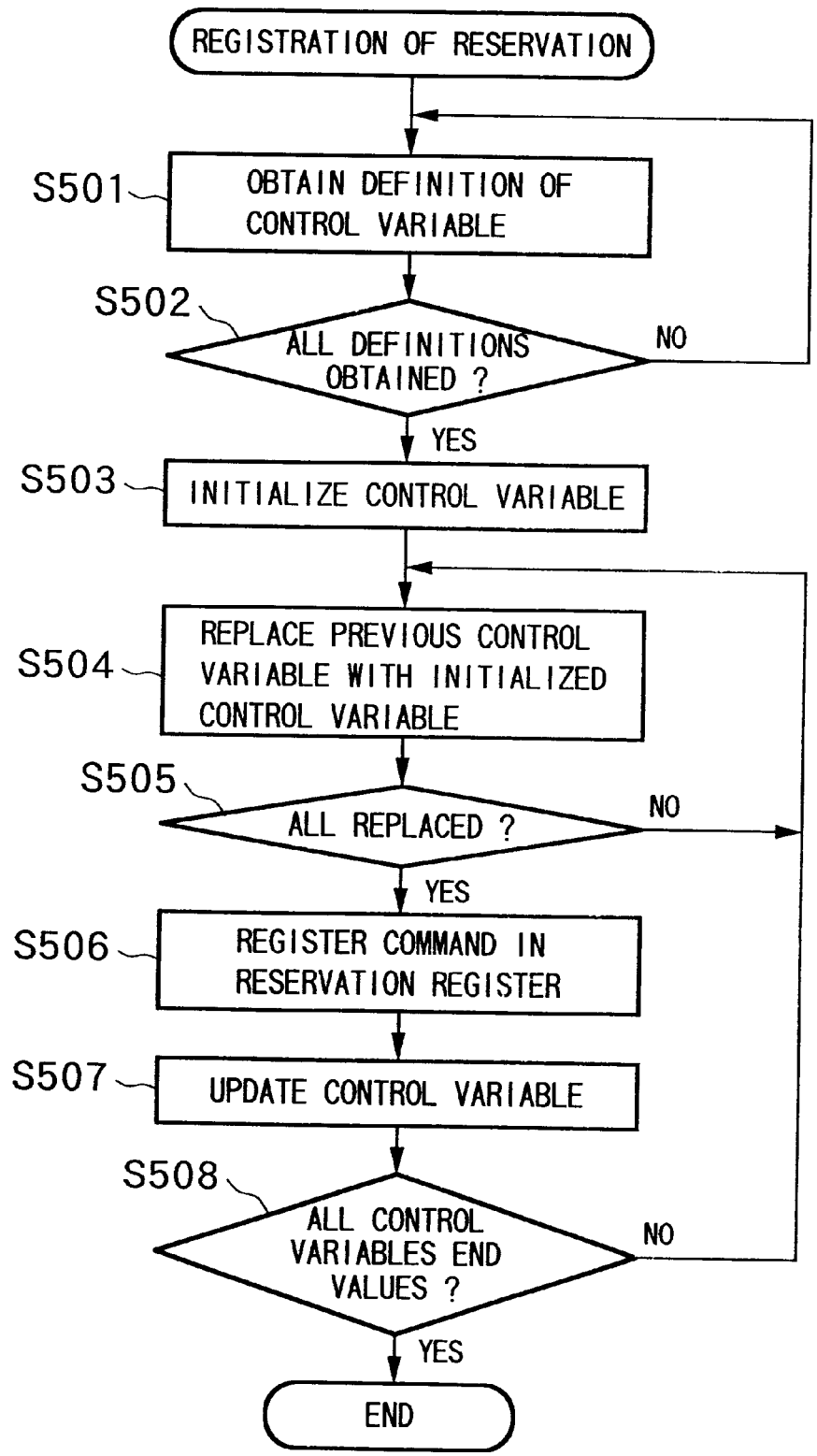
FIG. 8 is a flowchart showing a reservation registration process procedure according to a fifth example of the presuppositional part of the embodiments.

For example, the processing at step S106 is changed as shown in FIG. 8.

Note that if the character subsequent to "R" is as the definition of a control variable is described, the reservation command is described in accordance the fifth example. At step S501, one control variable definition which starts with "$(" and ends with ")" is obtained, and at step S502, it is determined whether or not all the definitions have been obtained. After all the definitions have been obtained, the control variable is initialized at step S503.

At step S504, the rest of the command is scanned to find a control variable reference which starts with "$(" and ends with ")", and previously initialized corresponding variable is replaced with the obtained control variable reference. At step S506, the character string obtained by the above processing is interpreted as a reservation command for the above-described repetitive image sensing. Then the programmed image sensing is registered with the same reservation code generated at step S105 and image format, and with designated image-sensing times and image-sensing conditions designated by the respective reservation commands, as a plurality of reservations, into the reservation register 1014. This processing is repeated until all the control variables have reached end values.

Thus, the above construction enables to easily perform interval image sensing while changing the camera angle by a short command.

Further, the present example uses only one definition of control variable, however, a plurality of definitions can be described as nested definition.

In the fifth example, repetitive construction is introduced; similarly, other constructions such condition-judgment, definition of variable, substitution of variable, operation using for arithmetic rules and the like, can be introduced.

That is, it may be arranged such that the command interpreter is realized as a program interpreter, to store the content of a URL as a program, and interpret and perform the program. This automatically performs even complicated camera control.

SIXTH EXAMPLE

In the fifth example, the camera angle of programmed image sensing must be described in the same URL. Then, in a sixth example, a part of a reservation command is separately registered as a macro library. In this example, data describing image-sensing time and image-sensing condition is stored in an external device.

For the purpose of explanation, it is assumed that image sensing is programmed with image-sensing time of 13:00 on Jul. 6, 1996, while changing the camera angle by every minute as follows:

pan angle of 25°, tilt angle of 0°, 3 times zooming
pan angle of 30°, tilt angle of 0°, 3 times zooming
pan angle of 35°, tilt angle of 0°, 3 times zooming
pan angle of 35°, tilt angle of 1°, 4 times zooming
pan angle of 35°, tilt angle of 2°, 4 times zooming
pan angle of 35°, tilt angle of 3°, 5 times zooming
pan angle of 35°, tilt angle of 4°, 5 times zooming
pan angle of 35°, tilt angle of 5°, 6 times zooming
pan angle of 35°, tilt angle of 5°, 7 times zooming
pan angle of 35°, tilt angle of 5°, 8 times zooming Commands designating the above image-sensing conditions and image-sensing times are stored into the secondary external device at:

http://www.bar.co.jp/camcon-a.ctl

In this case, the content of the file is, for example, as follows:

R1996.7.6.13.0P25T0Z3+R1996.7.6.13.1P30T0Z3+
R1996.7.6.13.2P35T0Z3+R1996.7.6.13.3P35T1Z4+
R1996.7.6.13.4P35T2Z4+R1996.7.6.13.5P35T3Z5+
R1996.7.6.13.6P35T4Z5+R1996.7.6.13.7P35T5Z6+
R1996.7.6.13.8P35T5Z7+R1996.7.6.13.9P35T5Z8.gif The command to be provided to the camera control apparatus starts with "%23(", then has the URL, and ends with ")". The reservation command is described as follows:

"http://www.foo.co.jp/%23(httpd%3e//www.bar.co.jp/
   camcon-a.ctl)"

In this case, "www.bar.co.jp" corresponds to the above secondary external device. That is, the camera server "www-.foo.co.jp" is required to perform control in accordance with the content described at "www.bar.co.jp/camcon-a.ctl". The above description "R1996 . . . " is stored in the "camcon-a.ctl".

Figure 9:
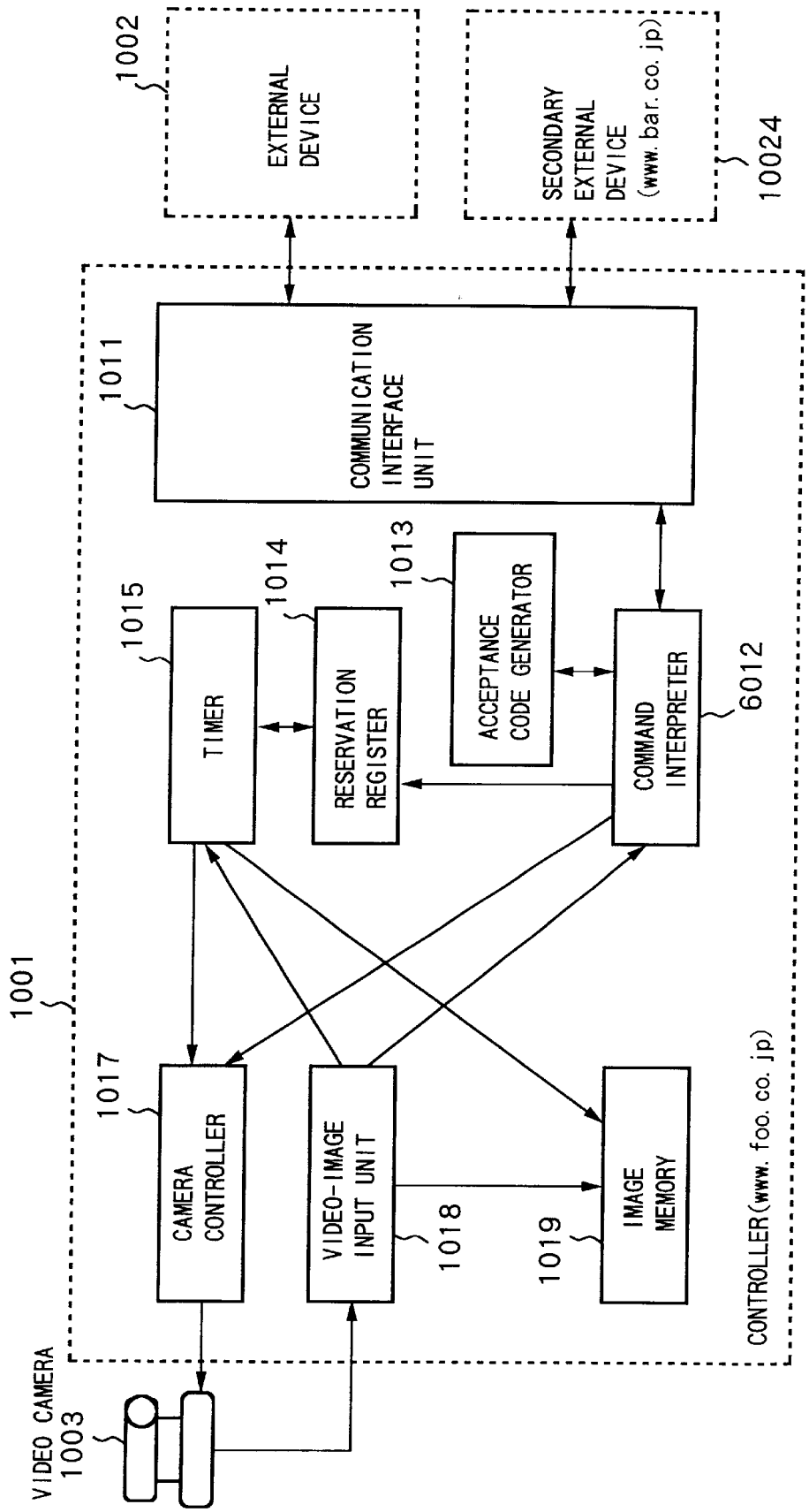
FIG. 9 is a block diagram showing the system according to a sixth example of the presuppositional part of the embodiments.

FIG. 9 shows the sixth example. In comparison with the fifth example, the basic construction of the sixth example is substantially the same as that of the fifth example except that a command interpreter 6012 interprets the above reservation command and a secondary external device 10024 is provided.

Figure 10:
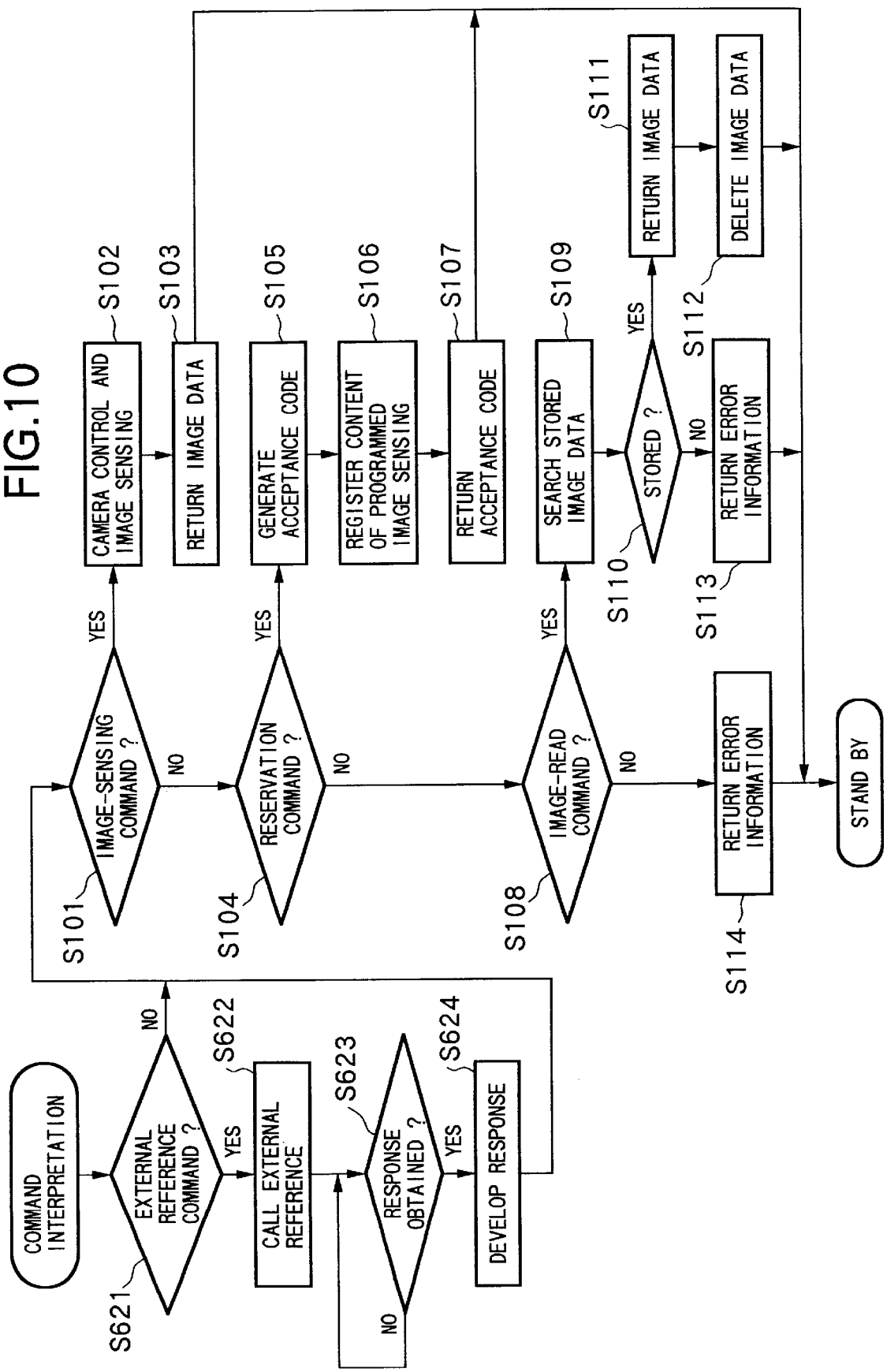
FIG. 10 is a flowchart showing the operation of a command interpreter 6012 according to a sixth example of the presuppositional part of the embodiments.

Next, the operation of the command interpreter 6012 will be described with reference to the flowchart of FIG. 10.

At step S621, a command described as a file name is interpreted. If the head of the command is "%23", it is recognized as an external reference command, then process proceeds to step S622. At step S622, a bracketed description "( )" is regarded as a URL designating the stored file in which the command is described, and a file transfer request is issued in accordance with the URL. In the above case, the file transfer request is sent to the secondary external device 10024. Then at step S623, a response is awaited.

As a result, a long reservation command as above is returned. The returned reservation command is developed by replacing it with the interpreted external reference command, for use in the subsequent command interpretation (step S624). Then the process proceeds to step S101.

Note that at step S621, if the command is not an external reference command, the process also proceeds to step S101.

The processing at step S101 and the subsequent steps is identical to that described in the first embodiment, therefore, explanation of those steps will be omitted. Further, modification to the second to fifth examples can also be applied to this example.

By the above construction, it is possible to easily perform interval image sensing programmed with complicated changes of time and camera angle by a short command.

In this example, the camera control apparatus and the external apparatus are described as separate apparatus, however, they may be integrated as a single apparatus. In this case, the URL is described as follows:

"http://www.foo.co.jp/%23(http%3e//www.foo.co.jp/
   camcon-a.ctl)" or

"http://www.foo.co.jp/%23(camcon-a.ctl)"

If the command is stored in the external device to which an image transfer request is first issued, the address of the device can be used. In such case, the secondary external device is unnecessary.

First Embodiment

In the above first to sixth examples, various ways of descriptions can be used in a reservation command, and a live video image and an image-sensed video image is obtained by a WWW browser. However, it is impossible to obtain more detailed information on a desired object in the displayed video image. The present embodiment attains the information on a desired object in a displayed video image.

For the sake of simplification, it is assumed that an apparatus as the above-described camera server and a client are provided on a network in a company. Note that the number of the camera servers and that of the clients may be arbitrarily determined.

Generally, when a network is constructed, various servers may be provided on it. Especially, in recent years, an integrated system has been constructed by connecting devices which have been used as stand-alone devices, such as a copier and a facsimile apparatus are connected on the network.

When a network is constructed and printing is attempted by using a remote print server, for example, print data output is completed in a very short period for a client, since the print server spools the print data. As the print server may also receive print data from a plurality of clients, the print data are outputted in accordance with the spooled order, to a printer.

The problem here is that the print server is not always near the client. When a plurality of clients perform print processing at the same time, the print data are queued, and when a user of one client goes to pick up a printout, the user often finds that printing based on another print data is still performed.

In the present embodiment, when a remote camera is controlled, if there is a printer as the object of printing desired by a client, within the view of the image, the status of the printer is added as additional information to the video image, and transferred to the client.

Figure 11:
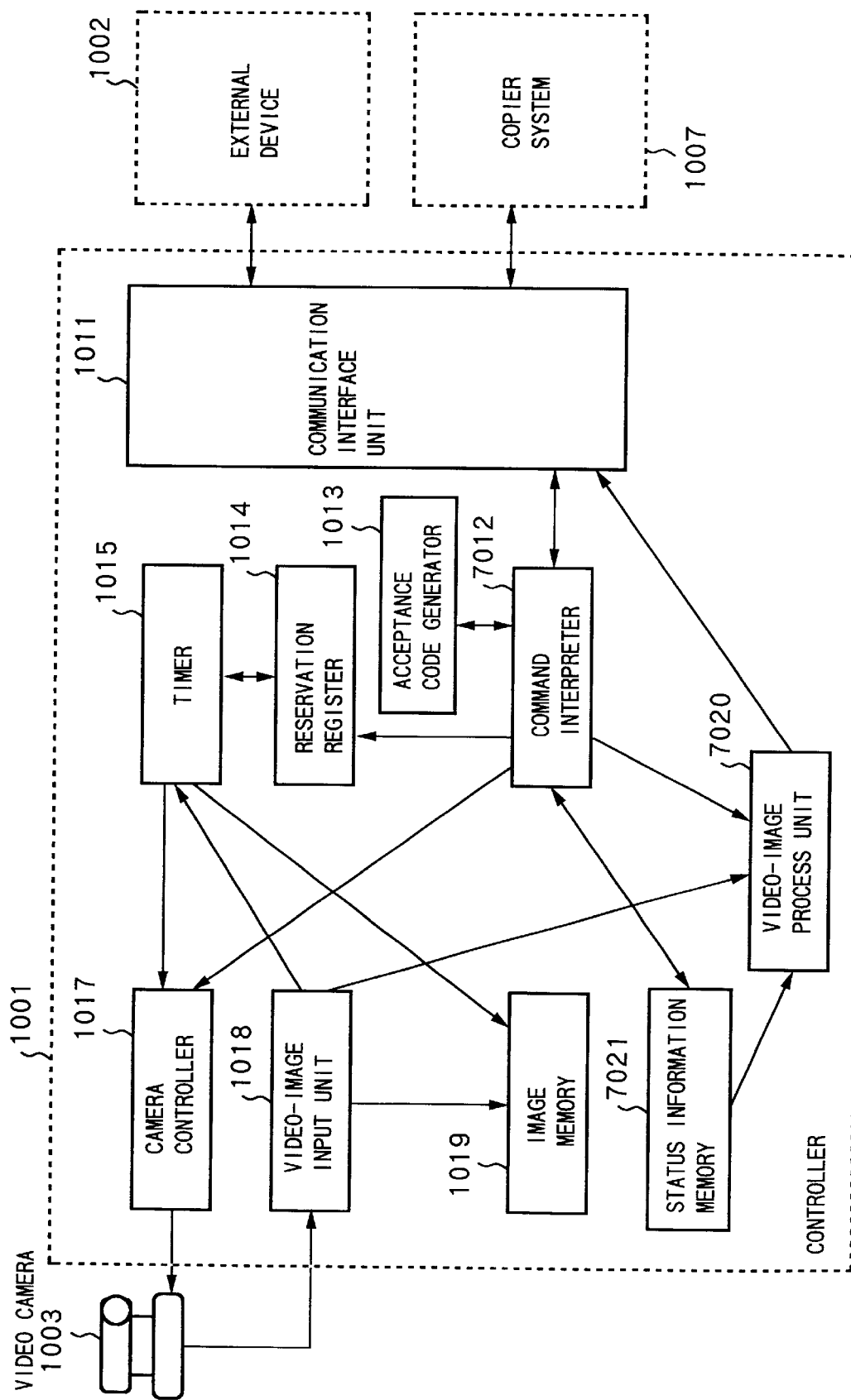
FIG. 11 is a block diagram showing the system according to a first embodiment.

FIG. 11 is a block diagram showing a server according to the first embodiment, comprising the following constituents.

Numeral 1003 denotes a camera in which a camera angle and image-sensing condition are controllable; and 1001, a controller which controls the camera 1003 in accordance with an instruction from an external device 1002, and returns an obtained video image. The controller 1001 is realized with e.g. a personal computer as a base. The controller 1001 further has a camera controller 1017 which controls the camera 1003 by RS-232C interface or the like, a video-image input unit 1018 which inputs a video image obtained by the camera 1003 by using an image capture device, and a communication interface unit 1011 for information exchanged between the present apparatus and another device. In addition to these resources, the controller 1001 has the following elements realized as programs and memory data utilizing a CPU, a memory device of a computer, an auxiliary storage device and the like.

That is, the controller 1001 has a command interpreter 1012, an acceptance code generator 1013, a timer 1015, an image memory 1019, a reservation register 1014, and a video-image process unit 7020 which processes a video image obtained from the video-image input unit 1018.

The external device 1002 is, for example, a WWW server or a WWW browser which performs communication by using the HTTP protocol. That is, a WWW browser issues a request in accordance with a URL indicating a storage destination of a desired data, to a WWW server in which document data and image data are stored. In response to the request, the WWW server returns corresponding document data or image data to the WWW browser.

A copier system 1007 is a copier having a network interface. Upon reception of a status information request via communication, the copier system 1007 returns status information of the copier at that time. For example, assuming that the identifier (name) of the copier is "copier#445", if it is printing when it receives a status information request, it returns status information as follows, including printing-progress status and printing settings:

"copier#445" client:Kurosawa printing "80%" "1 copy, page 23, double-sided"

"client: Korosawa" indicates the name of the client (or ID) that issued the present print job on the network. Note that "Kurosawa" who ordered printing, "1 copy" and "double-sided" depend on the print job, but "80%" and "page 23" vary with time. Further, the items of the returned information are not limited to above items but may be any other information. For example, if there is no print sheet and printing cannot be performed, information indicating this status is included in the information.

Note that the copier system 1007 also functions as an ordinary printer and an image scanner. Further, as it is impossible to return the above status information if the total number of pages in one print job is unknown, the copier system 1007 has an external storage device with a capacity large enough to store a queue of print jobs, such as a hard disk or the like. Further, when the copier system 1007 comprises a single copier, the above external storage device is necessary, however, if the copier system 1007 comprises a general-purpose device such as a personal computer and a device having only printing, copying and image reading functions, the general-purpose device manages the respective jobs. Accordingly, as the function to manage the jobs is realized by an external device and a program for performing the processings of the external device, the function may be provided in the controller 1001.

In the present embodiment, the communication interface unit 1011 is realized by a WWW server. That is, communication is performed by using the HTTP protocol, and the controller 1001 behaves as if it is a WWW server in application of video data. This can be realized if the controller 1001 also uses the communication method for the WWW server.

Procedure

The external device 1002 requires video image information by issuing a description as follows in accordance with the above-described first to sixth examples:

$(pan=0,upto180,up10)P$(pan)T0Z2

Assuming that the address of the controller 1001 in communication with the camera 1003 (temporarily "camera#122") is "www.camera122.foo.co.jp", and time to require a video image is "from 13:00 to 13:18, at 1-minute intervals, on Nov. 11, 1996", the above request is described as follows in one line.

http://www.camera122.foo.co.jp/R$(pan=0,upto180, up10)1996.11.11.13.0t1996.11.11.13.18e1$(pan) T0Z2.mpg On the other hand, the camera controller 1001 operates as follows.

Similar to the above-described first to sixth examples, regarding given control information, the controller 1001 controls the camera 1003 to operate in accordance with the control information and perform image sensing. Note that if it is determined that a device such as a copier is included in the view (a management table, containing angle information on an angle including the copier, is stored into a predetermined storage device in advance), to obtain information of the status of the device, an inquiry is made about current status of the device, and information as the result of inquiry is combined with the video image obtained by the camera.

The management of information, for determining whether or not the device is included in the view, is made by pre-storing the management table as shown in FIG. 15 into a predetermined storage device (e.g., a hard disk device), and using this table. In the management table, the first column shows objects of management such as a copier and a printer (by network address or ID). The second column shows positions of the devices. In this example, each position is specified with a floor of a building where the device is placed and 3-dimentional coordinates (unit: cm) in the floor. The third column shows the sizes of the devices (unit: cm). For example, the first row indicates that a device with an identifier "printer#231" is placed at a position, away from the center of north 4th floor as the origin coordinates, by 300 cm in a south-north direction and 450 cm in an east-west direction, and 100 cm above from the floor, and that the size of the device is 30 (length)×80 (width)×75 (depth) cm.

Figure 12:
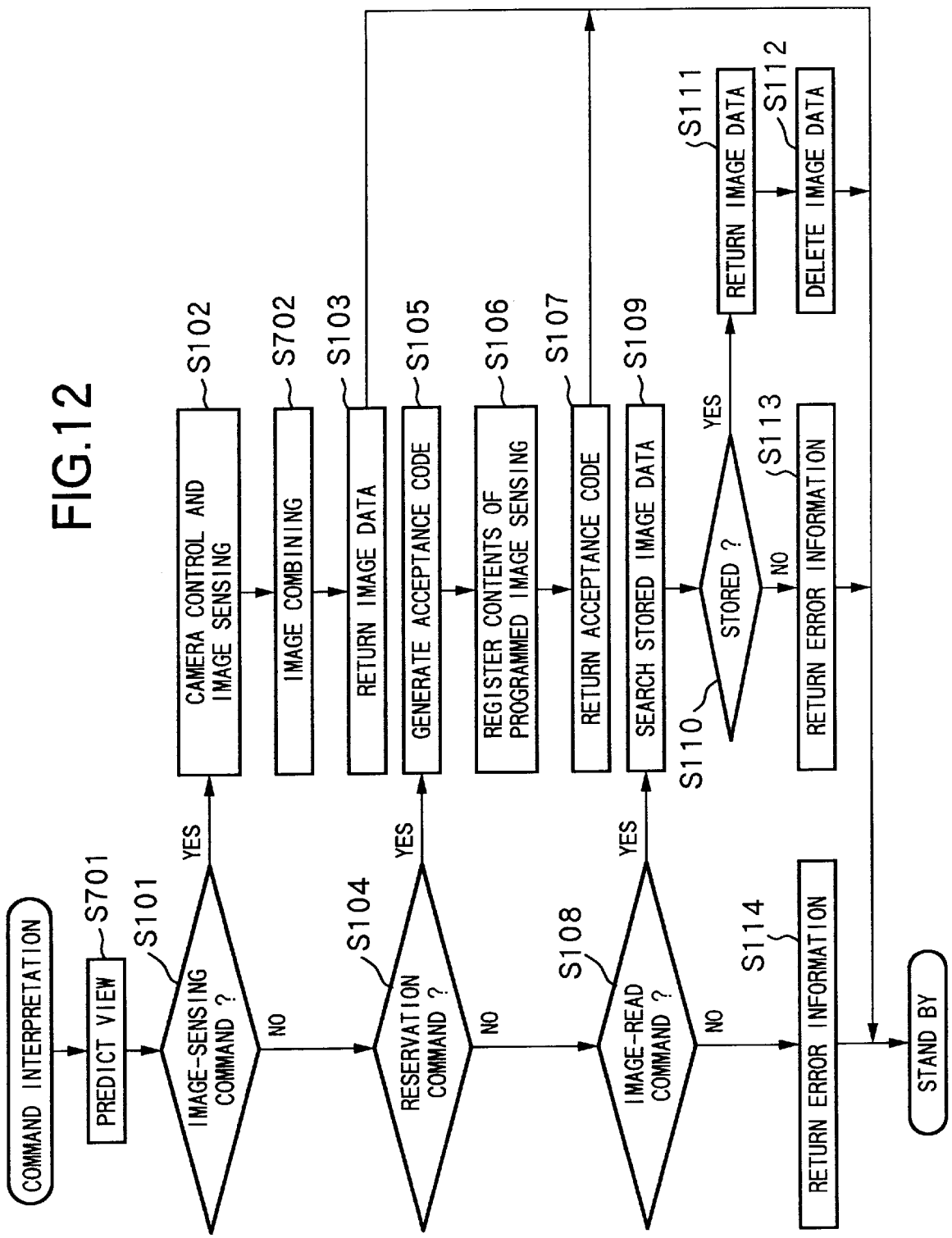
FIG. 12 is a flowchart showing process procedure of the command interpreter in FIG. 11.
Figure 14A:
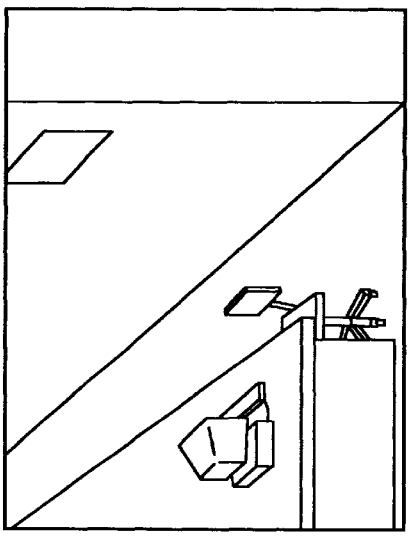
FIGS. 14A to 14D are views respectively showing time transition of video image transfer from the server of the first embodiment.
Figure 14B:
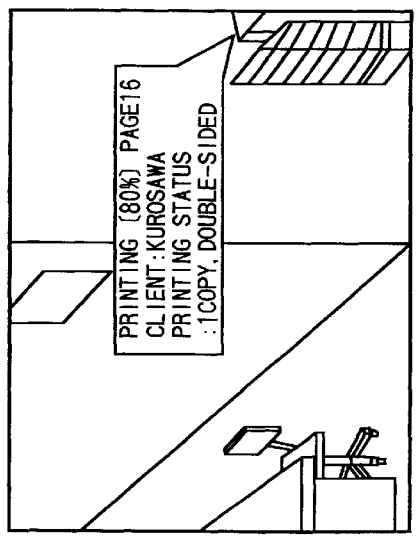
Figure 14C:
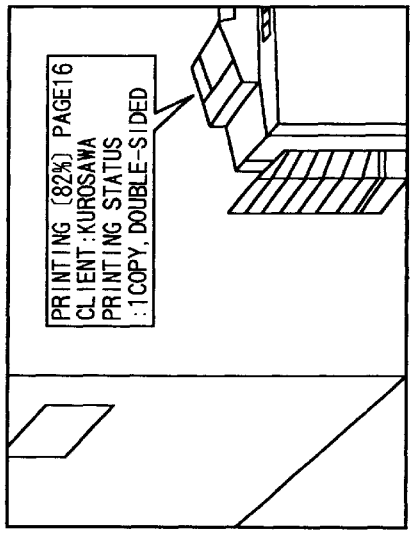
Figure 14D:
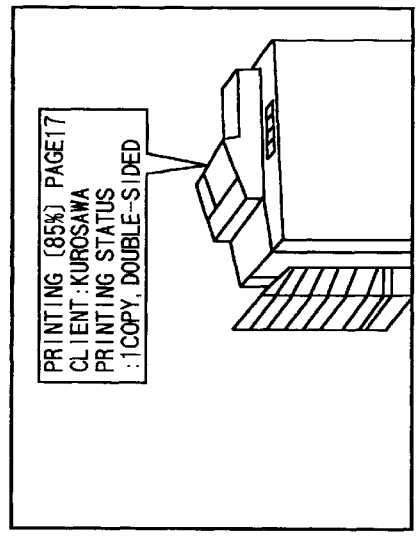

More specifically, the command interpreter is extended as follows, and a video-image process unit 7020 is added in correspondence with the extended command interpreter. The operation of the present embodiment will be described with reference to the flowchart of FIG. 12.

First, at step S701, the contents of a command is interpreted as follows to predict the view of image sensing.

First, in accordance with the control structure of the control information, control items to be performed are read. Next, the obtained control items are interpreted, and a view in a case where the camera 1003 is provided with the control content is predicted. Then, it is determined whether or not the device registered in the management table shown in FIG. 17 such as a copier is included in the view.

Finally, if the device is included in the view, the controller 1001 performs communication with the object device and obtains status information on the object device stored in a status information memory 7021. The status information stored in the status information memory 7021 is, for example, as follows:

("copier#445" client:Kurosawa printing "80%" "1 copy, page 23, double-sided")

Next, at step S101, the command described as a file name is interpreted. That is, if the head of the command is "P", it is recognized as an image-sensing command, then the process proceeds to step S102. At step S102, the camera is controlled via the camera controller 1017 to operate with designated pan, tilt and zoom values (step S102), and an image obtained by the image sensing is converted into an image of a designated image format.

Thereafter, at step S702, video image combining is performed. That is, the position of the object device in the video image is calculated from the control information when sensing the video image, an image is generated based on status information in the status information memory 7021, around the object device in the video image, and the image is combined with the video image. The result of combining is as shown in FIGS. 14A to 14D.

Then, the result of combining is returned via the communication interface unit 1011 to the external device 1002 requiring the video image (step S103). At this time, as the communication interface unit 1011 uses the HTTP protocol, content-type information and status information corresponding to the image format are added to the head of the image data. Then, the process ends.

Thus, the video image obtained by image sensing is pasted in an HTML document and displayed as if it is image data stored in a file in the WWW server.

In the command interpretation at step S101, if the head of the request is "R", the command is recognized as a reservation command. Then, the process proceeds to step S105 via the determination of image-sensing condition at step S104. The reservation command, which is used as described above, starts with "R"; then it continues with integers indicating year, month, day, hour, and minute, each terminated with a period, and with designation of panning, tilting and zooming as image-sensing condition; finally it ends with a name indicating the image format. For example, if video-image sensing is programmed with image-sensing time of 13:15 on Jul. 6, 1996, a pan angle of 25°, a tilt angle of 0° and a 3 times zooming, in gif format, the reservation is described as follows:

<img src="http://www.foo.co.jp/R1996.7.6.13.15P25T0Z3.gif">

When the above reservation command is designated, a unique identification number as an acceptance code is received from the acceptance code generator 1013, at step S105. The acceptance code may be a count value which is incremented by one (+1) at each request generated, or may be a numerical value indicating the designated time (year, month, date and time). Then, the acceptance code, the image-sensing time, the image-sensing condition and the image format are registered into the reservation register 1014 (step S106). The acceptance code is returned via the communication interface unit 1011 to the external device 1002 which issued the reservation command (step S107).

Note that at this time, content-type information and status information, indicating that the response is an acceptance code, are added to the head of the code. Then the process ends.

However, if an HTML document including such image-sensing reservation is simply generated but a general WWW browser is used to display the obtained image, the acceptance code instead of image data is returned and an image is not displayed. However, if image-sensing is reserved with respect to the camera control apparatus 1001 by using a CGI program or the like of the WWW server, in the same manner as that in the WWW browser, and after an acceptance code has been obtained, an HTML document is generated with image-data description designating the acceptance code by an image read command to be described later, image sensing can be performed as programmed when the document is displayed by the WWW browser, and the image data can be displayed.

Note that the image read command starts with alphabet "G", then continues with the acceptance code, and ends with the extension indicating the image format. The acceptance code is returned to the external device 1002 upon reservation.

For example, if "12543" is returned as an acceptance code, to read the image obtained by programmed image sensing, the following description is used:

<img src="http://www.foo.co.jp/G12543.gif">

The reservation register 1014 is realized in the format of a table, for example, as shown in FIG. 3, into a memory device of the controller 1001 or the auxiliary storage device.

For example, in the above reservation, when the acceptance code is "12543", the contents of the reservation is described as the first row of the table in FIG. 3.

When the reservation has been registered, image sensing as programmed is performed at the image sensing time, based on the timer to be described later. The image data is stored in the image memory 1019.

The image memory 1019 is realized in the format as shown in FIG. 4, for example, in the memory device of the controller 1001 or the auxiliary storage device (e.g., a hard disk). For example, the result of image sensing by the above reservation is recorded, as image data of the designated format, with the acceptance code and image format information, in the first row of the table in FIG. 4.

In the command interpretation at step S101, if the head of the command is "G", it is determined that the command is an image read command. The process proceeds via determination at steps S104 to S108 to step S109, at which data stored in the image memory 1019 is searched.

Then, it is determined whether or not the data obtained by the above search has the same value of the acceptance code described as the image read command (step S110). If YES, the image data is read, and transferred via the communication interface unit 1011 to the external 1002 requesting the image data. Also at this time, as the communication interface unit 1011 uses the HTTP protocol, content-type information and status information corresponding to the image format are added to the head of the image data (step S111).

At step S112, the image data in the storage area of the image memory 1019, from which the image data has been read out, is deleted. Then the process ends.

If it is determined at step S110 that image data corresponding to the designated acceptance code is not stored, error information indicating that the programmed image sensing has not been performed is returned via the communication interface unit 1011 to the external device 1002 requesting the image data. Then the process ends.

Further, if it determined at step S108 that the head of the command from the external device 1002 is not "G", error information indicating that the command is an undefined command is returned via the communication interface unit 1011 to the external device 1002 requesting the image. Then the process ends.

As described above, information exchange is performed between the external device 1002 and the camera control apparatus 1001 of the present embodiment.

Next, the timer 1015, used for performing camera control and storing the result of image-sensing, based on reservation data registered in the reservation register 1014, will be described.

In the timer 1015, at intervals of a predetermined period, e.g., one minute, a timer program is activated. This program is realized by utilizing a timer of a computer or the like.

The operation of the timer program will be described with reference to the flowchart of FIG. 13. First, the current time is read from a timer of the camera control apparatus 1001 (step S201), and the process proceeds to step S202. At step S202, reserved contents, i.e., items of programmed image sensing sequentially registered in a respective row of the table of the storage device are read from the reservation register 1014. When it is determined at step S203 that all the items of programmed image sensing have been read out, the process ends, otherwise, the process proceeds to step S204. At step S204, if it is determined that the designated time in the reserved data is in the future, the process returns to step S202 to repeat the processing. On the other hand, if it is determined at step S204 that the designated time has come, the process proceeds to step S205, at which the camera 1003 is controlled to perform image sensing, by the camera controller 1017, in accordance with the image-sensing condition of the items of the programmed image sensing read from the reservation register 1014.

Thereafter, at step S703, video image combining is performed. That is, the position of the object device is calculated from the control information upon image sensing to obtain the video image, and status information obtained by communication is combined with the video image at a position around the object device in the video image. The result of combining is, for example, as shown in FIGS. 14A to 14D.

Then, the combined image is converted into image data of the image format designated by a corresponding item of the programmed image sensing. The image data is stored, with an acceptance code and image format information, into the image memory 1019 (step S206). Next, the read items of programmed image sensing are deleted from the reservation register 1014 (step S207), and the process returns to step S202 to repeat the processing.

In this manner, image sensing is performed as programmed, and the result of the image sensing is stored. Thereafter, when an image read command is sent from the external device 1002, the image data is returned in response to the command.

As a result, the client can obtain the video image obtained by controlling the camera of the remote camera server, and also can check time transitional state of a pre-registered object (an integrated copier in the above example).

Accordingly, when a client performs printing, the client can confirm whether or not the printer is performing the print job, and further confirm the percentage of the completion of the print job.

Note that the present embodiment has been described as an example where an image indicating the status of a copier is combined with a displayed video image, however, this may be applied to any other OA (Office Automation) device such as a facsimile apparatus or a printer, or an AV (Audio Visual) device.

Further, in the present embodiment, the annotation of the status of the object device is simply combined with the displayed video image, however, more detailed annotation can be combined by zooming.

Further, the present embodiment has been described as an example where a device such as a copier is on-line connected via an information network, however, more simple construction without on-line connection can be made by preparing a management table as shown in FIG. 16. That is, the information in a fourth column as "annotation" items in the management table in FIG. 16 is directly combined with video image information. Further, another program to arbitrarily change the item "annotation" in the fourth column in FIG. 16 can be easily prepared.

Especially, when the camera server of the present embodiment is placed near a sightseeing spot or the like, on the Internet, if annotations are added to respective sightseeing objects to a video image, the sightseeing on the WWW browser is indexed, which is convenient.

Note that in some cases, such annotation or the like is obstructive for a viewer. Accordingly, it may be arranged such that a button to instruct to/not to display the annotation information is displayed on the WWW browser, and whether the annotation should be combined to a displayed image or not is determined based on whether or not the button has been pressed:

Further, in this case, the annotation video image may be combined by the server side or by the client side. If the combining is made by the server side, whether or not the annotation image should be combined is determined in accordance with an instruction from the client. Further, if the combining is made by the client side, it may be arranged such that information on the annotation and information on the object (information as shown in FIG. 16) are transferred to the client, and when the user on the client side instructs to display the annotation, a program on the browser performs display based on the information.

Second Embodiment

In this embodiment, similar to the first embodiment, a camera server set in an office inputs control information such as zoom, pan, tilt values or the like from an input unit, controls a camera in accordance with the control information to perform image sensing, and adds additional value to a video image obtained the image sensing, however, the video-image process unit of the second embodiment differs from that of the first embodiment.

Especially, in the second embodiment, desks of the staff members in the office are included in the video image of the office to be outputted. If a staff member is absent because the staff member is at a meeting or the like, a video image of a meeting room or the like is combined with the output video image by superimposing.

The second embodiment uses a management table as shown in FIG. 17 in place of the management table in the first embodiment. In the table in FIG. 17, the first column shows the staff members as objects. The second column shows desk positions of the object staff members. In this example, the desk position of each staff member is specified by a floor number of a building and three-dimensional coordinates (unit: cm) on the floor. The third column shows current positions of the staff members. The fourth column shows identifiers of cameras set around the current positions of the staff members. For example, in a case where a staff member with an identifier "Kurosawa" has a desk at a position on the north fourth floor of the building, and away from the center of the floor as the origin coordinates by 300 cm in a south-north direction, 450 cm in a east-west direction, and 10 cm from the floor, if this staff member is in a meeting room 191, the situation in the meeting room 191 can be image-sensed by a camera with an identifier "camera#249".

To realize this image sensing, steps S701 to S703 in the description of the operation of the camera server according to the first embodiment are changed as follows.

Change step S701 to step S711. At step S711, the control content is interpreted as follows, and the view of image sensing is predicted.

"The obtained control items are interpreted and the view of image sensing, if the camera is provided with the control content, is predicted. It is determined whether or not the view includes the desk of the staff member registered in the management table 22 and there is a camera around the current position of the staff member. Next, if it is determined that there is a camera around the current position of the staff member, arrangement is made to receive a video image obtained by the camera. This camera is called a second camera."

Change step S702 to video-image combining step S712 as follows. Similarly, change step S703 to step S713, to perform the following video-image combining operation.

"The desk position of the object staff member is calculated from the control information, and the video image obtained by the second camera is superimpose-combined with the video image to be outputted at a position around the desk in the video image."

In this example, in addition to simple video image information service, video image information with a high additional value can be generated, by interpreting the control information supplied to the video image input unit and predicting a video image obtained by the video image input unit.

In the present embodiment, the positions of the staff members can be fixedly determined by the management table, however, it is easily considered to construct a system where the respective staff members have a radio communication device to indicate their positions, and the current positions of the staff members are automatically tracked and video images around them are obtained.

Further, it is easily considered to provide a video image with additional value by video image process as described above, together with the video image process described in the first embodiment.

In this case, the type of video image process, or a video-image combining method and the like are designated as parameters of a video-image transfer request from a viewer, and the designation is interpreted by the camera server system, so as to prevent complication of a video image resulted from the process.

As described above, according to the present embodiment, it is possible to confirm the details of an object, apart from the object as a video image. Thus, a video image service with a high additional value can be provided.

Third Embodiment

Next, a third embodiment will be described. Similar to the above first and second embodiments, the third embodiment displays status information of an object in a video image obtained by a remote camera. Especially, the third embodiment displays more detailed information of the object if the object is clicked by a pointing device such as a mouse.

Figure 18:
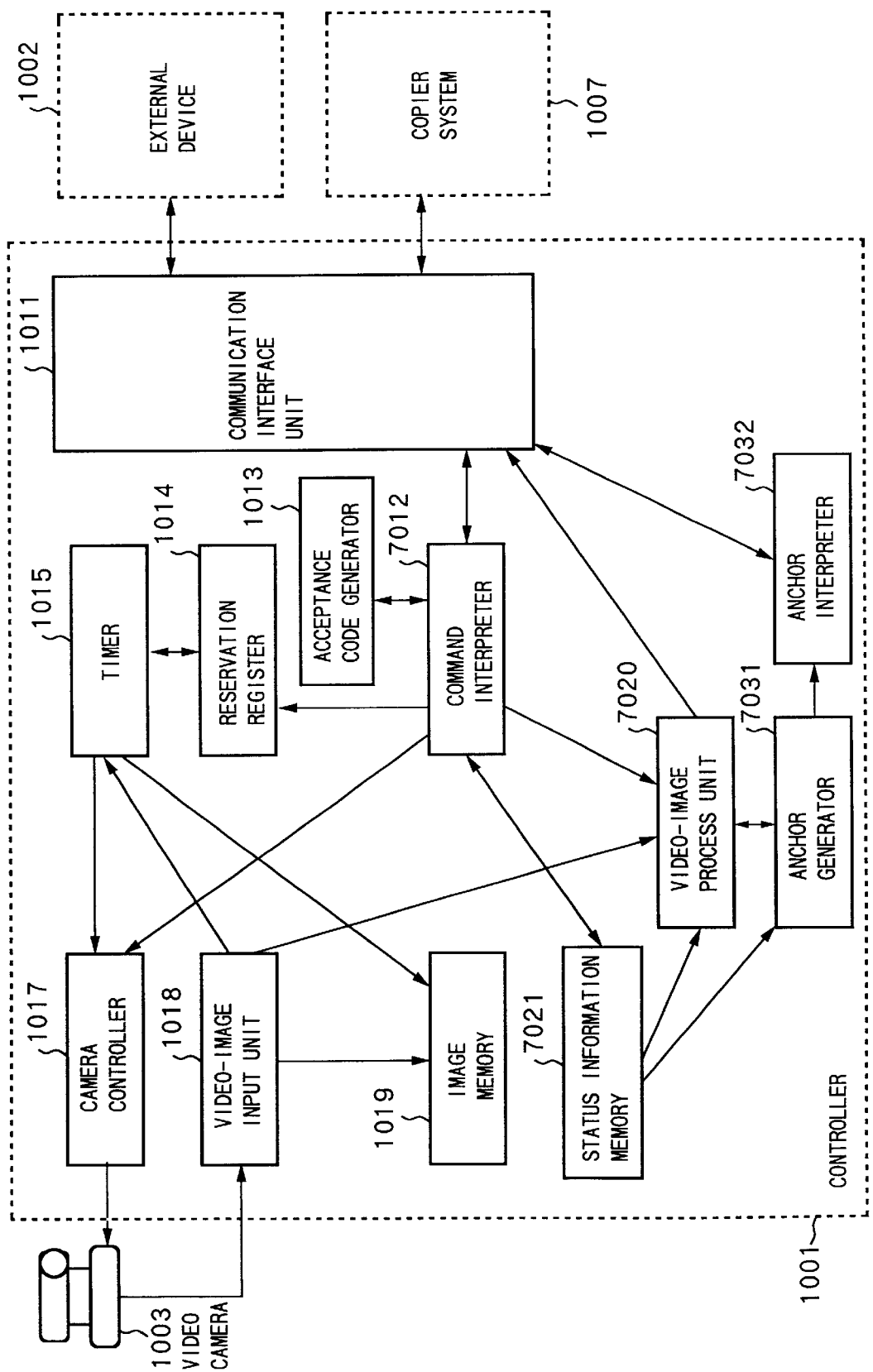
FIG. 18 is a block diagram showing the system according to a third embodiment.

FIG. 18 is a block diagram showing the construction of the camera controller 1001 according to the third embodiment. The difference from FIG. 11 of the first embodiment is that an anchor generator 7031 and an anchor interpreter 7032 are added to the construction. When an object in video image information transferred to a WWW browser (client) is clicked, the anchor generator 7031 generates a command to inform the camera controller 1001 of that status. The anchor interpreter 7032 interprets the command when it receives the command from the WWW browser.

The other elements are substantially the same as those in FIG. 11, and the operations of these elements will be apparent from the following description.

The external device 1002 is a WWW server or a WWW browser, for example, and performs communication by using the HTTP protocol. That is, a WWW browser sends a request in accordance with a URL indicating the storage destination of desired data to a WWW server which is a storage of document data and image data. In response to the request, the WWW server returns corresponding document data or image data to the WWW browser.

The copier system 1007 is a copier having a network interface. The copier system 1007 returns status information on current status of the copier in response to a status information request via communication. For example, if the identifier (name) of this copier is "copier_445" and it is printing when it receives a status information request, it returns status information as follows, including printing-progress status and printing settings:

"copier_445" client:Kurosawa printing "80%" "1 copy, page 23, double-sided"

"client: Korosawa" indicates the name of the client (or ID) that issued the present print job on the network. Note that "Kurosawa" who ordered printing, "1 copy" and "double-sided" depend on the print job, but "80%" and "page 23" vary with time. Further, the items of the returned information are not limited to above items but may be any other information. For example, if there is no print sheet and printing cannot be performed, information indicating this status is included in the information.

Note that the copier system 1007 also functions as an ordinary printer and a image scanner. Further, as it is impossible to return the above status if the total number of pages in one print job is unknown, the copier system 1007 has an external storage device with a capacity large enough to store a queue of print jobs, such as a hard disk or the like. Further, when the copier system 1007 comprises a single copier, the above external storage device is necessary, however, if the copier system 1007 comprises a general-purpose device such as a personal computer and a device having only printing, copying and image reading functions, the general-purpose device manages the respective jobs. Accordingly, as the function to manage the jobs is realized by an external device and a program for performing the processings of the external device, the function may be provided in the controller 1001.

In the present embodiment, the communication interface unit 1011 is realized by a WWW server. That is, communication is performed by using the HTTP protocol, and the controller 1001 behaves as if it is a WWW server in application of video data. This can be realized if the controller 1001 also uses the communication method for the WWW server.

Procedure

Although most of the operation procedures according to the present embodiment are the same as those in the first embodiment, the procedure will be sequentially described for the sake of deeper understanding of the present embodiment.

The external device 1002 requires video information by issuing the following description in accordance with the procedures in the above-described first to sixth examples:

$(pan=0,upto180,up10)P$(pan)T0Z2

The address of the controller 1001 corresponding to the camera 1001 (temporarily "camera_122"), requires a video image, is "www.camera122.foo.co.jp", and time to require a video image is "from 13:00 to 13:18, at 1-minute intervals, on Nov. 11, 1996", the above request is described as follows in one line.

Http://www.camera122.foo.co.jp/R$(pan=0,upto180,
up10)1996.11.11.13.0t1996.11.11.13.18e1$(pan)
T0Z2.mpg On the other hand, the camera controller 1001 operates as follows.

Similar to the above-described first to sixth examples, the controller 1001 controls the camera 1001 to operate in accordance with the control information and perform image sensing. Note that if it is determined that a device such as a copier is included in the view (a management table, containing angle information on an angle including the copier, is stored into a predetermined storage device in advance), to obtain information of the status of the device, an inquiry is made about current status of the device, and explanation of the obtained information as anchor is combined with the video image obtained by the camera.

The management of information for determining whether or not the device is included in the view is made by pre-storing a management table as shown in FIG. 17 into a predetermined storage device (e.g., a hard disk device), and referring to this table. The content of the management table is as described above.

Figure 19:
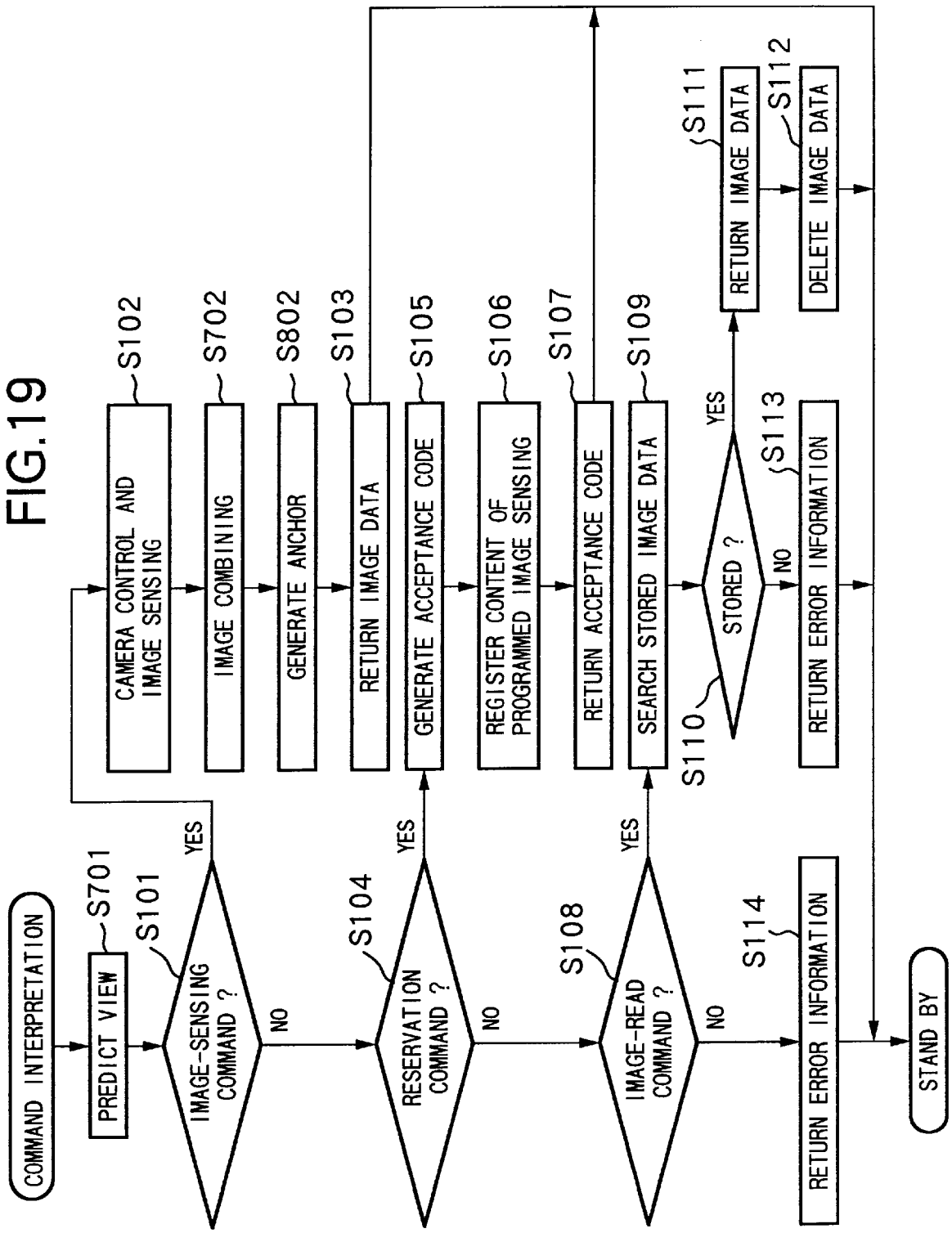
FIG. 19 is a flowchart showing a process procedure of the command interpreter in FIG. 18.

More specifically, the command interpreter is extended as follows, and a video image adder 7020, the anchor generator 7031, the anchor interpreter 7032 are added in correspondence with the extended command interpreter. Next, the operation of the present embodiment will be described with reference to the flowchart of FIG. 19.

First, at step S701, the control content from the WWW browser is interpreted as follows and the view of image sensing is predicted.

First, in accordance with the control structure of the control information, control items to be performed are read. Next, the obtained control items are interpreted, and a view in a case where the camera 1003 is provided with the control content is predicted. Then, it is determined whether or not the device registered in the management table shown in FIG. 17 such as a copier is included in the view.

If the device is included in the view, communication is performed with the object device and status information stored in a status information memory 7021 is obtained. The status information stored in the status information memory 7021 is, for example, as follows:

("copier_445" client:Kurosawa printing "80%" "1 copy, page 23, double-sided")

Next, at step S101, the command described as a file name is interpreted. That is, if the head of the command is "P", it is recognized as an image-sensing command, then the process proceeds to step S102. The camera controller 1017 is controlled to operate the camera with designated pan, tilt and zoom values (step S102), and an image obtained by the image sensing is converted into an image of a designated image format.

Thereafter, at step S702, video image combining is performed. That is, the position of the object device in the video image is calculated from the control information when sensing the video image, an image is generated based on status information in the status information memory 7021, around the object device in the video image, and the image is combined with the video image. The result of combining is as shown in FIGS. 14A to 14D.

Next, the process proceeds to step S802, an anchor is generated by combining, similar to clickable mapping method "imagemap" generally used on the www. That is, as interpreter when an object video image is clicked, the anchor interpreter 7032 is set as follows:

<a href="http://www.xxx.co.jp/cgi-bin/imagemap/
camera122.map">
<embed SRC=camera122.wvp width=290 height=179></
embed></a>

Then, an area of video image combining is added to a management information file of the clickable map, and as a link destination, a "copier management page" obtained by communication with the object device is set.

More specifically, the status information in the status information memory 7021, obtained by communication, is used to set link information in the "copier management page" as follows:

http://www.foo.co.jp/netdevices/copier_445/snmp.html

Then, the area where the status information is combined (relative position in the video image) is formed to have a rectangular shape with an upper-left vertex (15,8) and a lower-right vertex (135,39). Thereafter, information as follows is written in the management information are of the clickable map:

rect http://www.foo.co.jp/netdevices/copier_445/snmp.html 15,8 135,39

Thereafter, the result of combining is returned via the communication interface unit 1011 to the external device 1002 requiring the video image (step S103).

At this time, as the communication interface unit 1011 uses the HTTP protocol, content-type information and status information corresponding to the image format are added to the head of the image data. Then, the process ends.

Thus, the obtained video image is pasted in the HTML document as if it is image data stored in a file in the WWW server. Further, if a user clicks the combined image portion (around the copier) by a mouse or the like, the display is changed to the "copier management page" display.

For example, if the above file "www.foo.co.jp/netdevices/copier_445/snmp.html" is generated as a hyper-text file as shown in FIG. 24 (the format is visible in the browser display in FIG. 24), the content of FIG. 24 is displayed only when the user of the client clicks the displayed image around the copier.

In the command interpretation at step S101, if the head of the request is "R", the command is recognized as a reservation command. Then, the process proceeds to step S105 via the determination of image-sensing condition at step S104.

The reservation command is used for a service to make reservation of image sensing, and later transfer an obtained video image to a client. The reservation command starts with "R"; then it continues with integers indicating year, month, day, hour, and minute, each terminated with a period, and with designation of panning, tilting and zooming as image-sensing condition; finally it ends with a name indicating the image format. For example, if video-image sensing is programmed with image-sensing time of 13:15 on Jul. 6, 1996, a pan angle of 25°, a tilt angle of 0° and a 3 times zooming, in gif format, the reservation is described as follows:

<img src="http://www.foo.co.jp/R1996.7.6.13.15P25T0Z3.gif">

When the above reservation command is designated, a unique identification number as an acceptance code is received from the acceptance code generator 1013 at step S105. The acceptance code may be a count value which is incremented by one (+1) at each request generated, or may be a numerical value indicating the designated time (year, month, date and time).

Then, the acceptance code, the image-sensing time, the image-sensing condition and the image format are registered into the reservation register 1014 (step S106). The acceptance code is returned via the communication interface unit 1011 to the external device 1002 which issued the reservation command (step S107).

Note that at this time, content-type information and status information, indicating that the response is an acceptance code, are added to the head of the code. Then the process ends.

However, if an HTML document including such image-sensing reservation is simply generated but a general WWW browser is used to display the obtained image, the acceptance code instead of image data is returned and an image is not displayed. However, if image-sensing is reserved with respect to the camera control apparatus 1001 by using a CGI program or the like of the WWW server, in the same manner as that in the WWW browser, and after an acceptance code has been obtained, an HTML document is generated with image-data description designating the acceptance code by an image read command to be described later, image sensing can be performed as programmed when the document is displayed by the WWW browser, and the image data can be displayed.

Note that the image read command starts with alphabet "G", then continues with the acceptance code, and ends with the extension indicating the image format. The acceptance code is returned to the external device 1002 upon reservation.

Similar to the previous embodiment, if "12543", for example, is returned as an acceptance code, to read the image obtained by programmed image sensing, the following description is used:

<img src="http://www.foo.co.jp/G12543.gif">

The reservation register 1014 is stored in the format of a table, for example, as shown in FIG. 3, into a memory device of the controller 1001 or the auxiliary storage device. For example, in the above reservation, when the acceptance code is "12543", the contents of the reservation is described as the first row of the table in FIG. 3.

When the reservation has been registered, image sensing as programmed is performed at the image sensing time, based on the timer to be described later. The image data is stored in the image memory 1019.

The image memory 1019 is realized in the table format as shown in FIG. 4, for example, in the memory device of the controller 1001 or the auxiliary storage device (e.g., a hard disk). For example, the result of image sensing by the above reservation is recorded, as image data of the designated format, with the acceptance code and image format information, in the first row of the table in FIG. 4.

In the command interpretation at step S101, if the head of the command is "G", it is determined that the command is an image read command. The process proceeds via determination at steps S104 to S108 to step S109, at which data stored in the image memory 1019 is searched.

Then, it is determined whether or not the data obtained by the above search has the same value of the acceptance code described as the image read command (step S110). If YES, the image data is read, and transferred via the communication interface unit 1011 to the external 1002 requesting the image data. Also at this time, as the communication interface unit 1011 uses the HTTP protocol, content-type information and status information corresponding to the image format are added to the head of the image data (step S111).

At step S112, the image data in the storage area of the image memory 1019, from which the image data has been read out, is deleted. Then the process ends.

If it is determined at step S110 that image data corresponding to the designated acceptance code is not stored, error information indicating that the programmed image sensing has not been performed is returned via the communication interface unit 1011 to the external device 1002 requesting the image data. Then the process ends.

Further, if it determined at step S108 that the head of the command from the external device 1002 is not "G", error information indicating that the command is an undefined command is returned via the communication interface unit 1011 to the external device 1002 requesting the image. Then the process ends.

As described above, information exchange is performed between the external device 1002 and the camera control apparatus 1001 of the present embodiment.

Next, the timer 1015, used for performing camera control and storing the result of image-sensing, based on reservation data registered in the reservation register 1014, will be described.

In the timer 1015, at intervals of a predetermined period, e.g., one minute, a timer program is activated. This program is realized by utilizing a timer of a computer or the like.

The operation of the timer program will be described with reference to the flowchart of FIG. 20.

First, the current time is read from a timer of the camera control apparatus 1001 (step S201), and the process proceeds to step S202. At step S202, reserved contents, i.e., items of programmed image sensing sequentially registered in a respective row of the table of the storage device are read from the reservation register 1014. When it is determined at step S203 that all the items of programmed image sensing have been read out, the process ends, otherwise, the process proceeds to step S204. At step S204, if it is determined that the designated time in the reserved data is in the future, the process returns to step S202 to repeat the processing. On the other hand, if it is determined at step S204 that the designated time has come, the process proceeds to step S205, at which the camera 1003 is controlled to perform image sensing, by the camera controller 1017, in accordance with the image-sensing condition of the items of the programmed image sensing read from the reservation register 1014.

Thereafter, video-image combining is performed at step S703. That is, the position of the object device in the video image is calculated from the control information upon image sensing, and an image is combined around the object device in the video image, based on the status information stored in the status information memory 7021 as described above. As the result of combining is similar to that at the above-described step S702, the explanation of the result will be omitted. Further, as the anchor generating processing at step S803 is similar to step S802, the explanation of this processing will be omitted. The result of combining is as shown in FIG. 14.

Then, the obtained image is converted into image data of the image format designated by a corresponding item of the programmed image sensing. The image data is stored, with an acceptance code and image format information, into the image memory 1019 (step S206). Next, the read items of programmed image sensing are deleted from the reservation register 1014 (step S207), and the process returns to step S202 to repeat the processing.

In this manner, image sensing is performed as programmed, and the result of the image sensing is stored. Thereafter, when an image read command is sent from the external device 1002, the image data is returned in response to the command.

As a result, the client can see a video image obtained by controlling a camera of the remote camera server, and can confirm the realtime changing status of a pre-registered object (the integrated copier in the above example). Further, on the client side, when a particular position in the displayed video image is clicked, if an anchor is provided at the position, the content information at the position can be obtained.

Note that the present embodiment has been described as an example where the status of a copier is combined with a video image, however, this is applicable to any other, OA devices such as a facsimile and a printer or other AV devices.

Further, in the present embodiment, only one anchor is combined within a video image, however, it can be understood that a plurality of anchors can be represented within one video image by writing a plurality of information in management information of a clickable map. For example, a plurality of management information for the clickable map are as follows:

rect http://www.foo.co.jp/netdevices/copier_445/ snmp.html 15,8 135,39
    rect http://www.foo.co.jp/netdevices/facsimile_28/ snmp.html 20,18 55,39
    rect http://www.foo.co.jp/netdevices/colorprinterr_4/ snmp.html 55,21 135,39
    rect http://www.foo.co.jp/netdevices/printer_266/ snmp.html 15,8 135,39

Further, in the present embodiment, when the device such as a copier is on-line connected to a network, the management information of the device is accessed as a hyper text, however, the information are more directly related by preparing a management table as shown in FIG. 23. That is, in the management table in FIG. 23, the information in the fourth column "URL" is used as link destination for the anchor.

Note that it can be easily understood that prepare another program may be prepared to arbitrarily change the link destination item in the fourth column in FIG. 23.

The present embodiment has been described as an example where a www URL is overlapped with an anchor, however, the www URL can also be overlapped with an anchor of another format.

Fourth Embodiment

In a fourth embodiment, similar to the third embodiment, a camera server placed in an office receives control information such as zoom, pan and tilt values and the like from an input device, and controls a camera based on the control information to perform image sensing, thus provide a video image obtained by the image sensing with additional value, however, the video-image process unit of the fourth embodiment is different from that of the third embodiment.

Especially, in the present embodiment, a video image to be output includes desk positions of staff members of the office, and when a staff member is absent because the staff is at a meeting or the like, a video image of a meeting room or the like is superimposed over the output video image.

In this example, as shown in FIG. 21, the video-image process unit 7020, the anchor generator 7031 and the anchor interpreter 7032 of the third embodiment are replaced with an extended video-image process unit 7120, an extended anchor generator 7131, an extended anchor interpreter 7132. By using these units, anchor information is directly added to video image information and transferred to a client.

The operation of the extended video-image process unit 7120 is substantially the same as that of the video-image process unit 7020 except that the video-image process unit 7120 adds anchor information called "anchor script", generated by the extended anchor generator 7131, to video image information, resulted from image combining in the third embodiment.

Further, the client side has a function to interpret an anchor script, received by using the extended anchor interpreter 7132, and find an appropriate link destination, upon detection of click operation, in addition to the simple interpretation of video data. To provide the extended anchor interpreter 7132 to the client, a plug-in function, a helper application or the like may be employed.

The extended anchor generator 7131 generates an appropriate anchor script from a predicted view of a video image resulted from interpretation of control content, position information of the respective devices, and the link destination information in the management table as shown in FIG. 23.

Next, the operation of the present embodiment will be described.

To realize the above operation, steps S702 and S802 in the description of the camera controller in the third embodiment are replaced with steps S702' and S802' as follows:
Step S702'

First, video image combining is performed in accordance with step S702, and an anchor script generated by the extended anchor generator 7131 is added to the video information.

Step S802'

First, similar to step S701, the view of image sensing is predicted from the interpretation of the control content. Next, an anchor script as follows is generated from the predicted view of image sensing and the position information and link destination information of the respective devices in the management table as shown in FIG. 18. Then an anchor having a name "a1" is generated with a link destination as follows:

"http://www.foo.co.jp/netdevices/copier_445/snmp.html"

The anchor is combined with a rectangular area having an upper-left vertex (15,8) and an lower-right vertex (135,39) as follows:

<anchors>
<a href="http://www.foo.co.jp/netdevices/copier_445/snmp.html">a1</a>
<embed a=a1 range=15,8+135,39></embed>
</anchors>

In the present embodiment, as well as simple video-image information service, control information supplied to the video-image input unit is interpreted and a video image obtained by the video-image input unit in advance is predicted, so as to generate video image information with higher additional value.

Similar to the third embodiment, the fourth embodiment has been described as an example where only one anchor is combined within a video image, however, it is understood that a plurality of anchors can be easily represented in one video image by extending an anchor list. For example, it can be considered to generate an anchor list as follows:

<anchors>
<a href="http://www.foo.co.jp/netdevices/copier_445/snmp.html">a1</a>
<a href="http://www.foo.co.jp/netdevices/facsimile_28/snmp.html">a2</a>
<a href="http://www.foo.co.jp/netdevices/colorprinter_4/snmp.html">a3</a>
<a href="http;://www.foo.co.jp/netdevices/printer_266/snmp.html">a4</a>
<embed a=a1 range=5,8+15,19></embed>
<embed a=a2 range=20,18+35,39></embed>
<embed a=a3 range=55,21+135,39></embed>
<embed a=a4 range=30,30+135,45></embed>
</anchors>

Figure 22A:
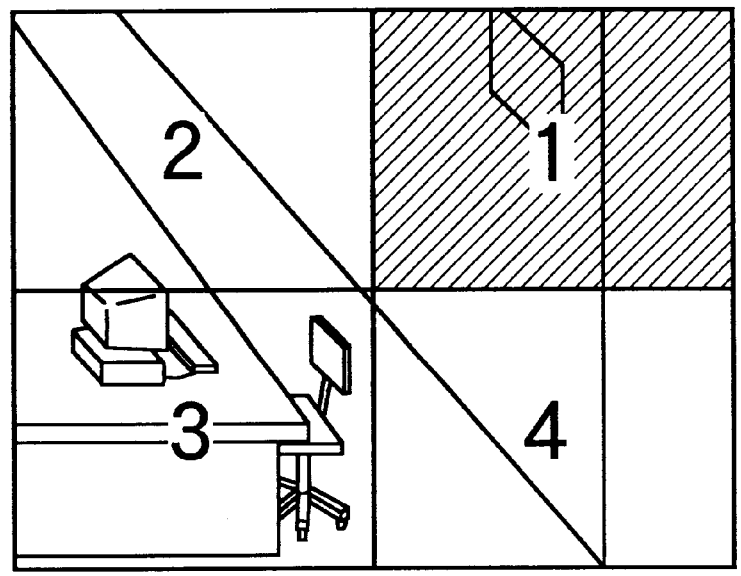
FIGS. 22A and 22B are explanatory views showing area designation according to the fourth embodiment.
Figure 22B:
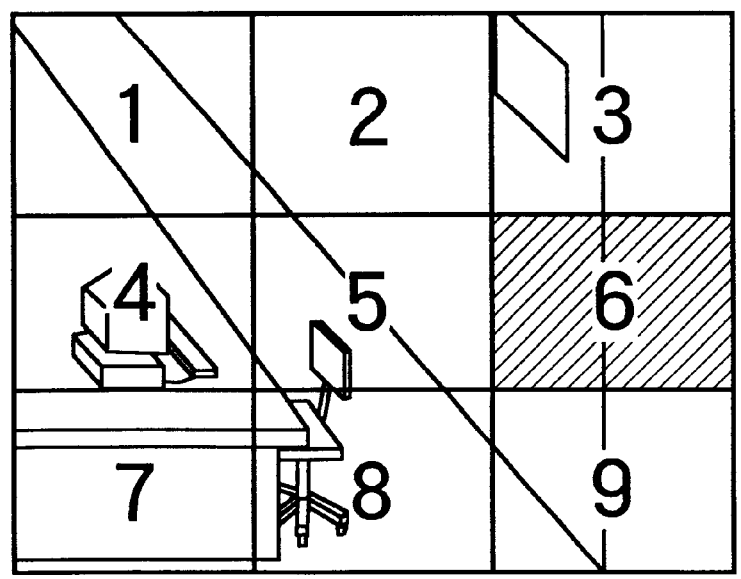

Further, in the anchor script described in the present embodiment, the position of the anchor in a video image is specified by using two-dimensional coordinates such as "range=15,8+135,39", however, it may be specified by using a simple fractional representation. For example, as shown in FIG. 22A, in a video image divided into four areas, a first quadrant (upper-right area) is specified as "range=1/4". Similarly, as shown in FIG. 22B, in a video image divided into nine areas, numbers are allotted to the areas from an upper-left area, and for example, the sixth area is specified as "range=6/9".

Further, the present embodiment has been described as an example where anchor information is added to each of images in a video image, however, it is possible to improve efficiency of the operation by adding anchor information with respect to one scene, as follows:

<anchors>
<a href="http://www.foo.co.jp/netdevices/copier_445/snmp.html">a1</a>
<a href="http://www.foo.co.jp/netdevices/facsimile_28/snmp.html">a2</a>
<a href="http://www.foo.co.jp/netdevices/colorprinter_4/snmp.html">a3</a>
<a href="http://www.foo.co.jp/netdevices/printer_266/snmp.html">a4</a>
<embed a=a1 scene=132714+50 range=5,8+15,19></embed>
<embed a=a2 scene=132730+20 range=20,18+35,39></embed>
<embed a=a3 scene=132720+40 range=55,21+135,39></embed>
<embed a=a4 scene=132714+50 range=30,30+135,45></embed>
</anchors>

In the above-described third and fourth embodiments, display is made by remote-operating an object having status which varies with time (copier in the fourth embodiment), however, regarding an object with fixed status, it is not necessarily connected to a network, and further, does not necessarily operate electrically.

For example, it may be arranged such that in a case where a video image in an office is displayed, when a desired desk is clicked, information on the user of the desk is displayed.

Further, in the above-described third and fourth embodiments, when an object (copier) is included in the view of a camera, the status information of the object is combined with a video image obtained by the camera, and if the object is clicked, more detailed information on the object is displayed. However, it may be arranged such that the status information and the more detailed information are displayed when they are clicked.

As described above, according to the third and fourth embodiment, in addition to the service to providing an object as a video image, a video image is appropriately processed with the video image as material, thus a video image service with higher additional value can be provided.

Fifth Embodiment

The present invention provides a technique applicable to a system where a camera, connected to an information network, for example, is controlled from a remote client, and a video image obtained by the camera is sent to the client via the network, thus the video image can be monitored on the client side.

The basic technique relating to the above purpose is as disclosed in Japanese Patent Application Laid-Open No. 8-193729, and a part of the present invention utilizes this technique.

Further, in the following embodiment, with respect to a video image obtained by a remote camera, an explanatory image of the video image is combined with the video image. The basic technique relating to this purpose is similar to that of the first embodiment.

In the following fifth embodiment, a portion not especially explained is application of the above basic technique.

Next, the fifth embodiment as an example of the present invention will be described with reference to the drawings.

In the fifth embodiment, a video image obtained and provided by the remote camera server side (a camera 101 and a server controller 102 in FIG. 25) is referred to by a client terminal (a client controller 107 in FIG. 25) on the user side.

Especially, in the fifth embodiment, the camera 101 image-senses a scene of a city, and an annotation (character string) on the obtained video image is combined with the video image and the combined image is displayed.

The present invention is applicable to a system comprising a camera server, at least one client terminal for the camera server and a network connecting them. Hereinbelow, the construction of a system using one camera server and a plurality of client terminals will be described with reference to FIG. 25.

Figure 25:
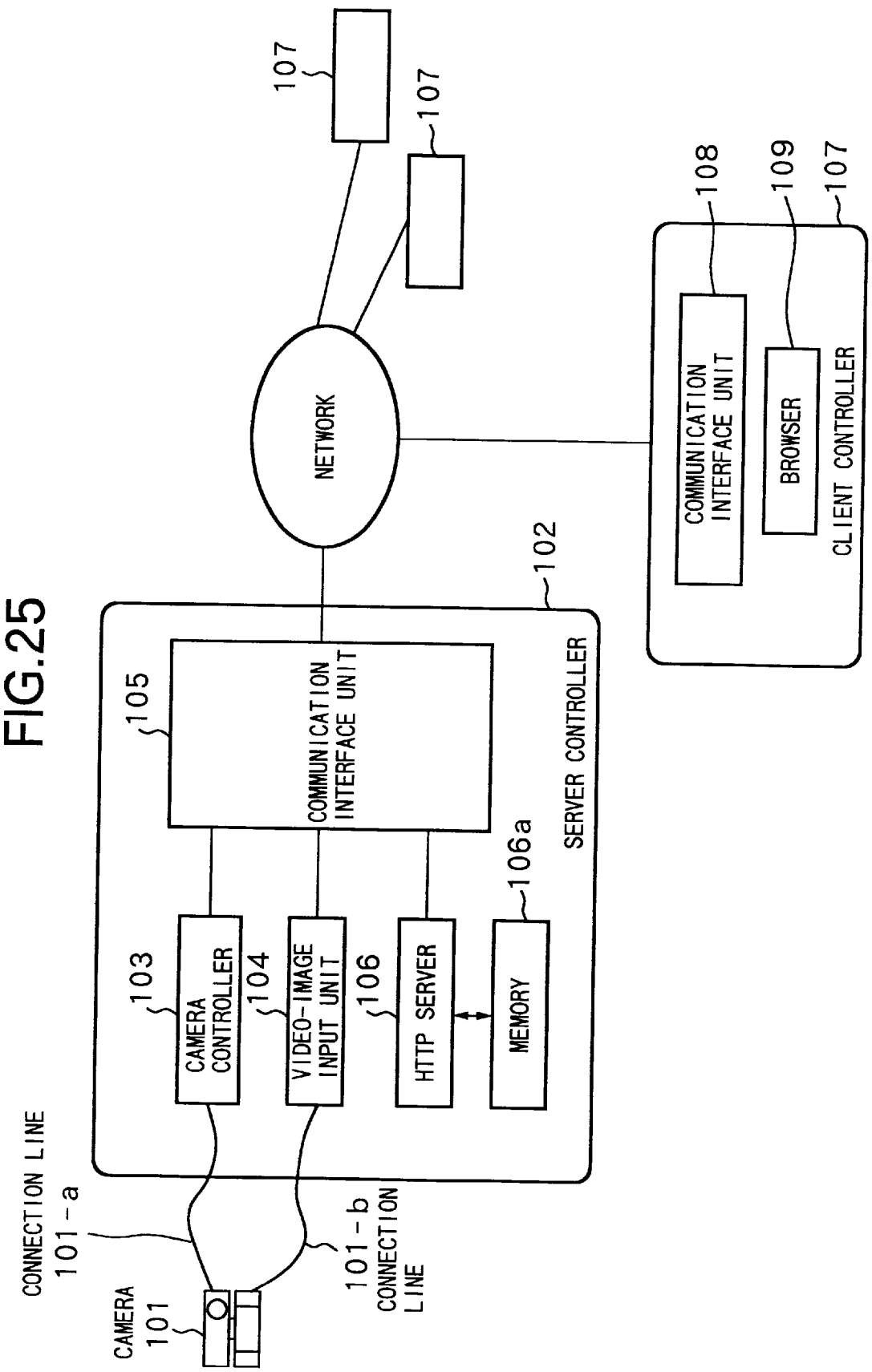
FIG. 25 is a block diagram showing the system according to a fifth embodiment.

In FIG. 25, numeral 101 denotes a camera controlled based on a control signal indicative of the camera angle, image-sensing condition and the like, supplied via a connection line 101-a. The camera 101 real-time outputs data on an obtained video image via a connection line 101-b.

Numeral 102 denotes a server controller which controls the camera 101 based on the control signal transmitted from a client controller to be described later via a network line. Note that the camera 101 and the server controller 102 are generally called a camera server. The server controller 102 comprises so-called personal computer or the like.

Further, the server controller 102 may receive a video image transmitted from the camera 101 and transmit the received video image to a plurality of client controllers via the network line.

The specific construction of the server controller 102 will be described below.

Numeral 103 denotes a camera controller which controls the camera 101 via the connection line 101-a (RS232C interface or the like). The camera controller 103 obtains camera control information, transmitted from a client controller 107 to be described later and inputted via the network line and a communication interface unit 105, interprets the camera control information, and controls the camera 101 based on the control information. Note that the camera control information in this embodiment is information to be transmitted among the respective devices to control the camera 101.

Numeral 104 denotes a video-image input unit such as an image capture device, which inputs a video image obtained by the camera 101 via the connection line 101-b.

The communication interface unit 105 is a network adapter which performs image information communication, audio information communication, and communication of various types of control information with an external device (the client controller 107 or the like) connected via the network line. The network adapter is called communication interface unit.

Further, the server controller 102 has a CPU for controlling the operations of respective units in the device and necessary calculation, and storage devices such as a ROM, and a RAM. The server controller 102 stores programs and various parameters into the storage devices.

Numeral 106 denotes a World Wide Web server (hereinafter referred to as "HTTP server") which returns necessary image information, audio information and the like to a home page on the Internet or the like, in response to a request from the client controller.

The HTTP server 106 holds combining condition for combining a video image from the camera 101 with an annotation (explanation of the video image, or characters or an image indicating the state of the video image or the like), an annotation image, character information and the like, stored in advance in a memory 106a.

Next, the client controllers 107 which receive image and audio information via the network line from the above-described camera server, and display a home page on the Internet based on the received information will be described.

The client controller 107 obtains image information and camera control information from the server controller 102, and displays appropriate information on a monitor in accordance with an operation input from a user.

Similar to the server controller 102, the client controller 107 mainly comprises a personal computer.

The basic construction of the client controller 107 will be described.

Numeral 108 denotes a network adapter having a function similar to that of the communication inter face unit 105. The network adapter 108 is also called communication interface unit. The communication interface unit 108 transmits various information with an external device on the network.

Numeral 109 denotes a web browser (hereinafter simply referred to as "browser") which displays image and audio information outputted from the HTTP server, and executes an applet program sent from the server controller 102. Note that in practice, the browser operates by using a CPU and a ROM or RAM in which a necessary program or the like is stored, in the browser.

Next, the communication operation by using the respective devices in FIG. 25 will be described with reference to FIG. 26.

Figure 26:
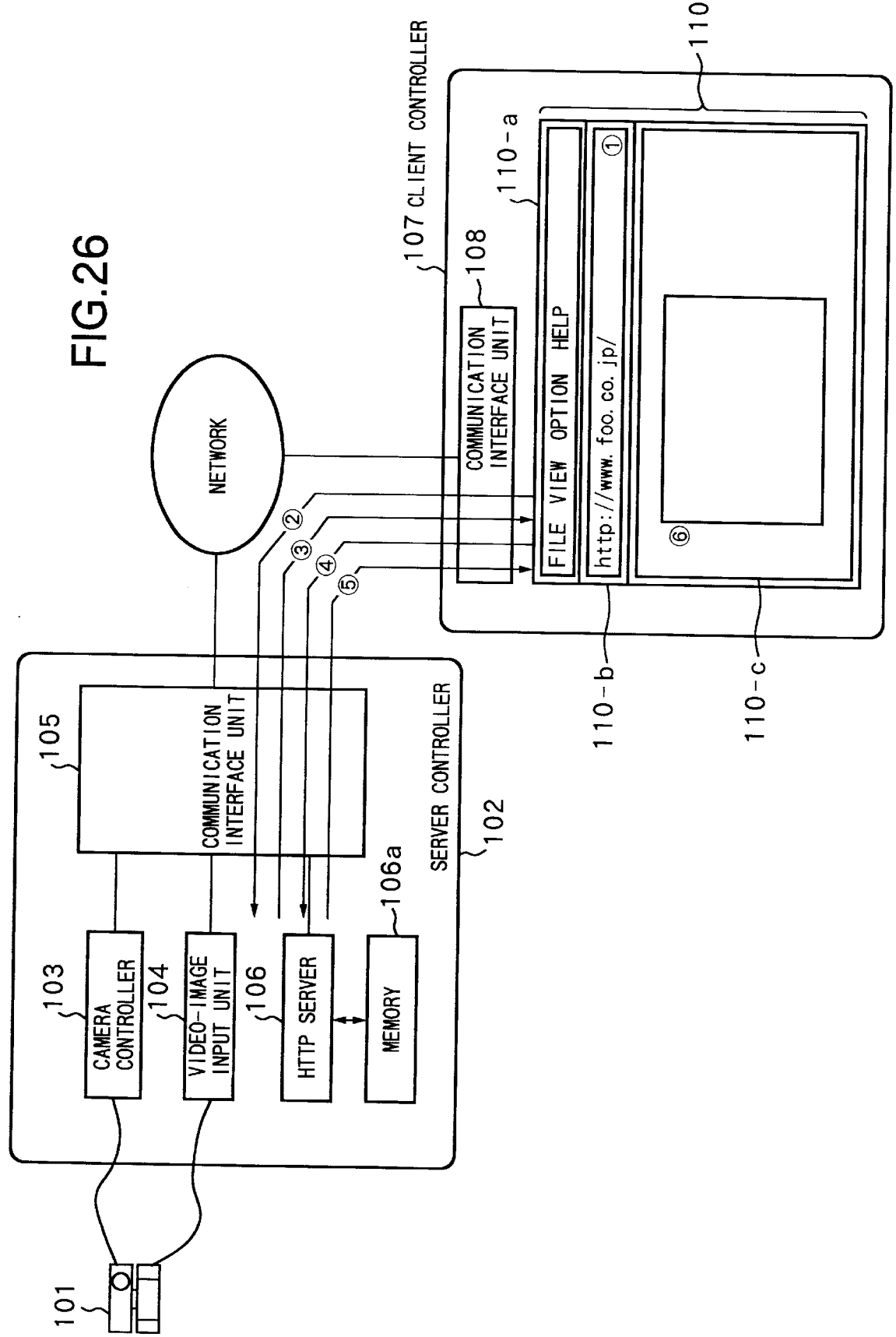
FIG. 26 is a block diagram for explaining the outline of the operation of the fifth embodiment.

In FIG. 26, a user on the client controller 107 side first activates the browser 109 of the user's device. Numeral 110 denotes a display for displaying a home page on the Internet when the browser 109 is activated. Wen the browser is activated, the display 110 displays an image as shown in FIG. 26, then, the user inputs a character string such as "http://www.foo.co.jp/" at a position 110-b, and refers to a home page issued by the server controller 102. (①).

Next, the browser 109 accesses the address "www.foo.co.jp", the server controller 102, and requires the server controller 102 for text information of the input address.(②)

In response to the request, the server controller 102 transmits the following text information to the client (③):

<HTML>
<HEAD>
<TITLE>home page of www.foo.co.jp</TITLE>
</HEAD>
<BODY>
Welcome to www.foo.co.jp
<applet code=webview width=400 height=300>
<param name=scope1 value="100,200,−100,100,600, 1000">
<param name=message1 value="E S building, 200,200">
</BODY>
</HTML>

The text information includes an <applet> tag. This tag means that "Display the applet at a designated position". Accordingly, the browser 109 (client controller 107) again accesses the server controller 102 and requires the server controller 102 to transmit an applet named "webview". (④)

The applet is an intermediate execution format code generated by java compiler. The applet is stored in the memory 106 of the server controller 102. The browser 109 corresponding to java downloads the applet from the server controller 102 and executes it in the browser 109. (⑤)

As the applet stored in the server controller 102 is platform-independent, the applet operates on various platforms.

The applet compares the camera control information and the combining condition, then based on the result of comparison, an annotation is combined with the video image from the camera 101 at an appropriate position in the video image, and the combined image is displayed in an area 110-c. (⑥) Further, the browser 109 has means for receiving input from the user.

Next, the server controller 102 returns the applet to the client controller 107. The client controller 107 executes the applet.

Hereinbelow, the operation procedure of the applet, i.e., the control procedure of the CPU will be described with reference to FIG. 27.

First, at step S1301, the browser 109 reads the <param> tag which is text information transmitted to the client controller 107.

The <param> tag describes range designation of camera information (zooming, panning, tilting), a message to display by the browser of the client if these zooming, panning and tilting are within the designated ranges.

Note that arbitrary number of items may be described. When a plurality of items are described, numbers from "1" are assigned as suffixes to the respective tags.

An example of the text information obtained by the browser 109 of the client controller 107 is as follows:

```
<HTML>
<HEAD>
<TITLE>home page of www.foo.co.jp</TITLE>
</HEAD>
<BODY>
Welcome to www.foo.co.jp
<applet code=webview width=400 height=300>
<param name=message1 value="E S Building">
<param name=panRange1 value="-100,100">
<param name=tiltRange1 value="0,100">
<param name=zoomRange1 value="1.0,1.2">
<param name=locate1 value="0,0">
<param name=message2 value="ABC Computer Company">
<param name=panRange2 value="-50,50">
<param name=tiltRange2 value="0,50">
<param name=zoomRange2 value="3.0,3.6">
<param name=locate2 value="5,0">
<param name=message3 value="Shoes shop">
<param name=panRange3 value="-100,0">
<param name=tiltRange3 value="0,100">
<param name=zoomRange3 value="1.0,1.2">
<param name=locate3 value="10,0">
</BODY>
</HTML>
```

The applet obtains the content of the <param> tag by the following command:

value=getParameter("message1");

By executing this command, the value of the <param> tag named "message1", i.e., the character string "E S Building" is obtained as returning value. Such command is repeated to obtain all the <param> tags.

The details of the contents of the respective tags will be described below.

A tag named "message" indicates a message to be displayed for a user.

A tag named "panRange" indicates the minimum and maximum values of the range of panning of the camera.

A tag named "tiltRange" indicates the minimum and maximum values of the range of tilting of the camera.

A tag named "zoomRange" indicates the minimum and maximum values of the range of zooming of the camera.

A tag named "locate" indicates a position in a display screen where a message is overlaid when zooming is one time (equal size).

At step S1302, the content of the tag obtained at step S1301 is initialized into array and stored.

The message is stored as an array named "message"; the panning minimum value is stored as an array named "panRangeMin; the panning maximum value is stored as an array named "panRangeMax"; the tilting minimum value is stored as an array named "tiltRangeMin"; the tilting maximum value is stored as an array named "tiltRangeMax"; the zooming minimum value is stored as an array named "zoomRangeMin"; the zooming maximum value is stored as an array named "zoomRangeMax"; the x coordinates of the message (when zooming is equal size) is stored as an array named "locateX"; and the y coordinates of the message (when zooming is equal size) is stored as an array named "locateY".

At this time, the message 0 is stored as a 0-th element, and the message 1 is stored as a first element.

The array of the respective values are as follows:

message [0]="E S Building"

message [1]="ABC Computer Company"

message [2]="Shoes shop"

...

panRangeMin [0]=−100 panRangeMin [1]=−50 panRangeMin [2]=−100

...

panRangeMax [0]=100 panRangeMax [1]=50 panRangeMax [2]=100

Next, at step S1303, an user interface is generated.

Figure 28:
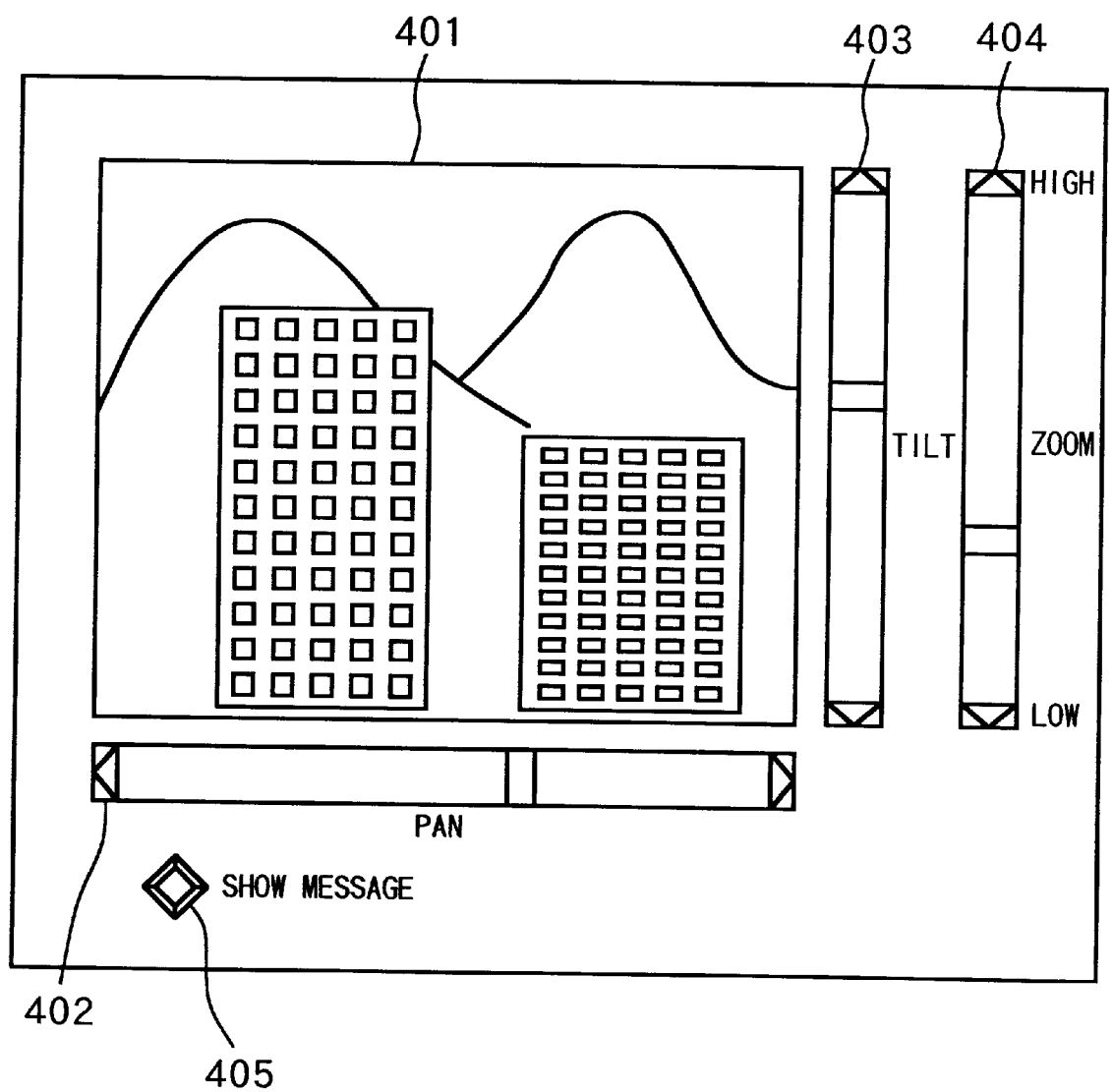
FIG. 28 is an example of user interface of an applet of the fifth embodiment.

FIG. 28 shows an example of the user interface. In FIG. 28, numeral 401 denotes a video-image display area where an image sent from the server controller 102 is displayed; 402, a slider bar to control panning of the camera of the server; 403, a slider bar to control tilting of the camera of the server; 404, a slider bar to control zooming of the camera of the server; and 405, a toggle button to select whether or not annotations on respective objects in the video image are overlay-displayed in the image area. Note that a mode where the annotations on the respective objects in the video image are overlay-displayed in the image area is referred to as a "message display mode".

Note that the slider bars 402 to 404 and the toggle button 405 functions when they are clicked or dragged by a mouse (not shown).

Figure 27:
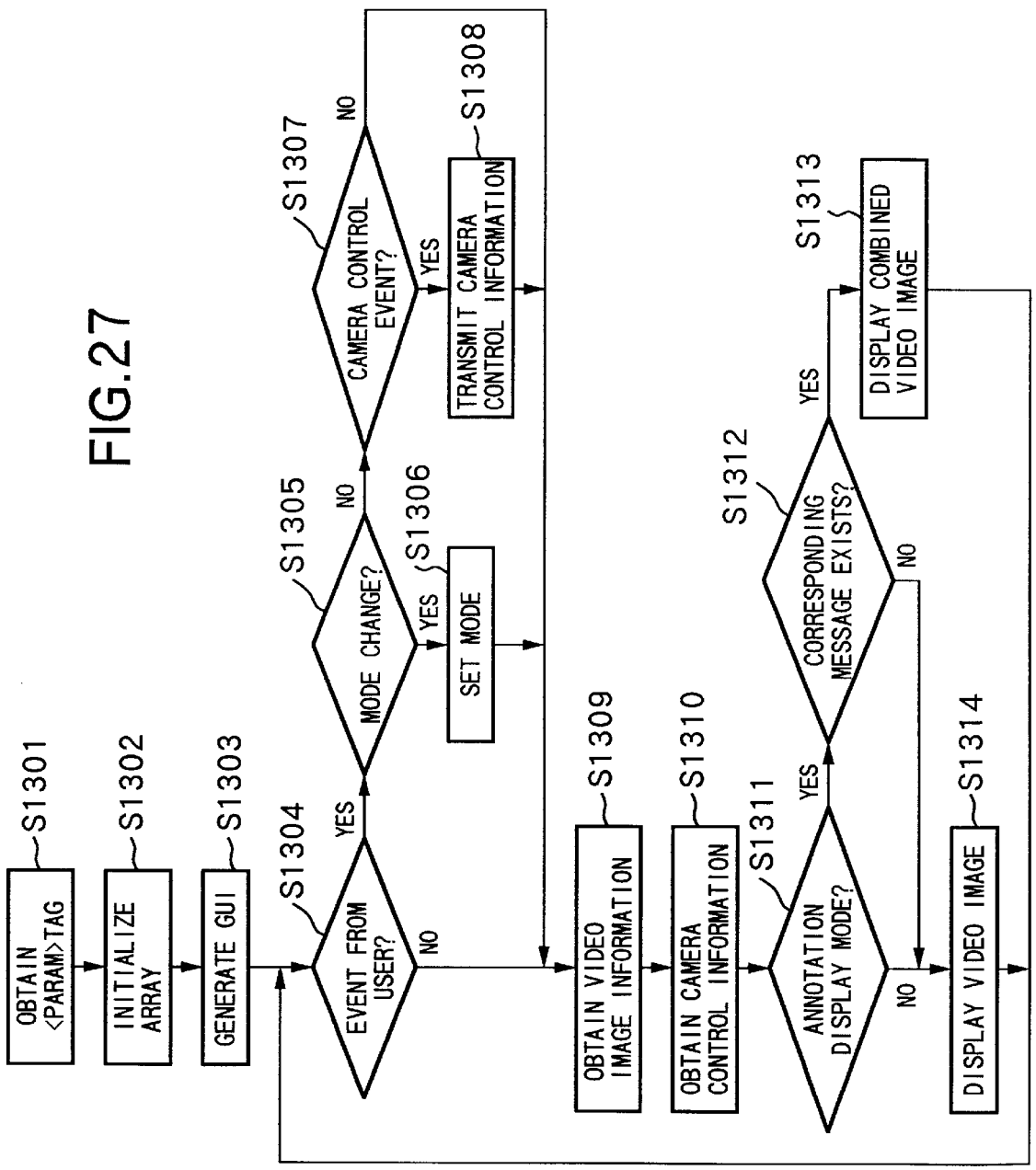
FIG. 27 is a flowchart showing a process procedure according to the fifth embodiment.

Next, at step S1304 in FIG. 27, it is checked whether or not any event has been made (by clicking by the mouse or the like) from the user. If NO, the process proceeds to step S1309, while if YES, proceeds to step S1305.

At step S1305, it is determined whether or not the event detected at step S1304 is that by pressing the toggle button 405. If it is determined that the event is toggle-button pressing event, the process proceeds to step S1306. If it is another event, the process proceeds to step S1307.

At step S1306, a message display mode is set in accordance with the status of the toggle button. Specifically, if the toggle button is in selected status, the setting of the message display mode is turned ON. If the toggle button is not in selected status, the setting of the message display mode is turned OFF.

At step S1307, it is detected which of the slider bars 402 to 404 is operated, as the event detected at step S1304, then the current value of the operated slider bar is obtained, and the process proceeds to step S1308.

At step S1308, the value of any of the slider bar 402 to 404 is transmitted to the camera controller 103 via the communication interface units 108 and 105. For example, in a case where the user has operated the tilt slider bar 403, if the value of the slider bar is "100", the camera control information "tilt=100" is sent to the camera controller 103 through steps S1304, S1305, S1307 and S1308.

The camera controller 103 changes the direction of the camera 101 such that it has the "tilt=100" direction.

At step S1309, image data obtained by the video-image input unit 104 is obtained via the communication interface units 105 and 108. The obtained image data corresponds to one frame of a video image obtained by the camera 101.

In the present embodiment, the server controller transmits image data to the respective client controllers 107 at predetermined intervals (e.g., one second). Accordingly, the obtained video image displayed in the video-image display area 401 of the respective client controllers 107 is a moving image having a small number of frames per unit time. Note that this does not pose any limitation on the present invention. The communication data amount can be reduced by arranged such that video-image reception is instructed from a user in accordance with necessity. On the other hand, in a system in which obtained image data can be transmitted by using a network line for high-speed communication, a complete moving image can be displayed by transmitting a video image at tends of frames/second.

At step S1310, the camera control information, obtained by the camera controller 103 from the camera 101, is obtained via the communication interface units 105 and 108. The camera control information indicates present direction (pan and tilt) and zoom setting values of the camera 101.

For example, values "zoom=1, pan=30, tile=100" is obtained.

This means that "the camera 101 is currently in a state where zoom=1, pan=30 and tilt=100".

Next, at step S1311, the setting of the message display mode is examined. If the message display mode is ON, the process proceeds to step S1312, otherwise, proceeds to step S1314.

At step S1312, the camera control information obtained at step S1310 and the arrays initialized at step S1302 are compared, and items corresponding to the current camera information are searched.

For example, the first item is a condition "pan value is −100 to 100, tilt value is 0 to 200, and zoom value is 1.0 to 1.2", as follows:

<param name=message1 value="E S Building">
<param name=panRange1 value="−100,100">
<param name=tiltRange1 value="0,100">
<param name=zoomrange1 value="1.0,1.2">
<param name=locate1 value="0,0">

Assuming that the current camera position is "pan=10, tilt=20, zoom=1.1", it corresponds to the condition described in the first item.

Further, depending on the value of the camera control information obtained at step S1310, none of the items may correspond to the information. In this case, the process proceeds to step S1314, at which the CPU displays only the received video image in the video-image display area 401 without combining a message with the image. If even one item corresponds to the information, the process proceeds to step S1313.

At step S1313, a message (annotation on the video image) is obtained from the arrays initialized at step S1302. The CPU combines the message with the image data obtained at step S1309, and displays the combined image data in the video-image display area 401.

The coordinates to display the message are obtained by calculation in accordance with the following procedure.

Procedure 1: First, the central position of the range of the condition, and the difference is added to the position.

x1=(panRangeMax+pamRangeMin)/2+locateX
  y1=(tiltRangeMax+tiltRangeMin)/2+locateY Procedure 2: The difference is obtained between current pan and tilt values (the values obtained at step S1308) and the values at the procedure 1.

x2=x1-panValue panvalue=current pan value
  y2=y1-tiltValue tiltvalue=current tilt value Procedure 3: The values at the procedure 2 is multiplied with the current zoom value (the value obtained at step S1308).

x3=x2*zoomValue zoomValue=current zoom value
  y3=y2*zoomValue

Procedure 4: The difference is obtained between the coordinates at the center of the screen and the values obtained at the procedure 3.

Then, the message is displayed at the position.

For example, if the first item has the above condition "pan value is −100 to 100, tilt value is 0 to 200, and zoom value is 1.0 to 1.2", the following values are obtained by the procedure 1:

x1=(100−(−100)/2+0=0
  y1=(100−0)/2+0=50

Then the following values are obtained by the procedure 2:

x2=x1−10=−10
  y2=y1−20=30

Then the following values are obtained by the procedure 3:

x3=x2*1.1=−11
  y3=y2*1.1=33

Accordingly, the character string "E S Building" can be combine-displayed at a position represented by coordinates (−11,33) from the center of the screen displaying the video image.

FIG. 29A shows the user interface at that time, and FIG. 29B shows a case where the current direction and zoom of the camera are "pan=10, tilt=20, zoom=1.1", i.e., only the zoom value is changed from the status shown in FIG. 29A.

As it is understood from these figures, in accordance with video-image display status (image-sensing status of the camera) such as pan, tilt, zoom and the like, whether or not the annotations on the video image (respect objects) are displayed, or display position of the annotations are automatically determined, and combine-display is performed. Thus, annotations on the video image can be displayed corresponding to the image-sensing range, zoom ratio and the like of the camera.

Especially, the present embodiment determines whether or not a predetermined annotation is combine-displayed in accordance with the zoom ratio. Accordingly, an annotation which is not helpful unless its corresponding object is displayed in somewhat large size, such as the annotation "ABC Computer Company" in FIG. 29B, is appropriately combine-displayed in accordance with necessity. Also, an annotation which is not helpful unless its corresponding object is displayed in somewhat small size is appropriately combine-displayed in accordance with necessity.

Note that the present invention is not limited to the selection as to whether or not respective annotations are combined in accordance with the zoom ratio of a video image, as the above embodiment. It may be arranged such that the size of the respective annotations are changed in accordance with the zoom ratio of the video image. Specifically, the annotation "ABC Computer Company" is not displayed in the case shown in FIG. 29A, but as a modification, the annotation "ABC Computer Company" in smaller font size than in font size in FIG. 29B may be displayed.

Further, the above embodiment combine-displays respective annotations in accordance with the zoom ratio of an obtained video image, however, the present invention is not limited to this arrangement. It may be arranged such that combining of the annotations is controlled, based on the sizes of respective objects in the video image. For example, in a case where the position of the camera is movable, when a predetermined object is image-sensed at the same zoom ratio, the size of the object in the video image might change. Accordingly, the present invention also includes a case where combining of an annotation is controlled in accordance with a predetermined object size compared with a reference size.

Sixth Embodiment

Next, a sixth embodiment where character information is overlaid on video image obtained from a remote camera server, similar to the fifth embodiment, will be described.

The difference from the fifth embodiment is that messages (annotations on objects) in different formats can be displayed in accordance with user's selection. In the sixth embodiment, display of a message in Japanese or English is selected.

FIG. 6 shows a user interface having an operation unit for selection of this construction. To realize the present embodiment, the following modification is made to the fifth embodiment.

First, the text information stored in the server controller 102 is changed as follows:

<applet code=webview width=400 height=300>
<param name=messageJ1 value="E S

```
<applet code=webview width=400 height=300>
<param name=messageJ1   value="E S ビル">
<param name=messageE1   value="E S Building">
<param name=panRange1   value="-100,100">
<param name=tiltRange1  value="0,100">
<param name=zoomRange1  value="1.0,1.2">
<param name=locate1     value="0,0">
```

">
<param name=messageE1 value="E S Building">
<param name=panRange1 value="-100,100">
<param name=tiltRange1 value="0,100">
<param name=zoomRange1 value="1.0,1.2">
<param name=locate1 value=0,0">

As the text information obtained from the server controller 102 in the fifth embodiment is changed, at step S1301 in FIG. 27, the routine to obtain the <param> tag is changed as follows:

In the first embodiment:
value=getParameter("message1");
In the present embodiment:
Jvalue=getParameter("messageJ1");//Japanese message
Evalue=getParameter("messageE1");//English message At step S1302, arrays are prepared in correspondence with a plurality of messages.

Figure 30:
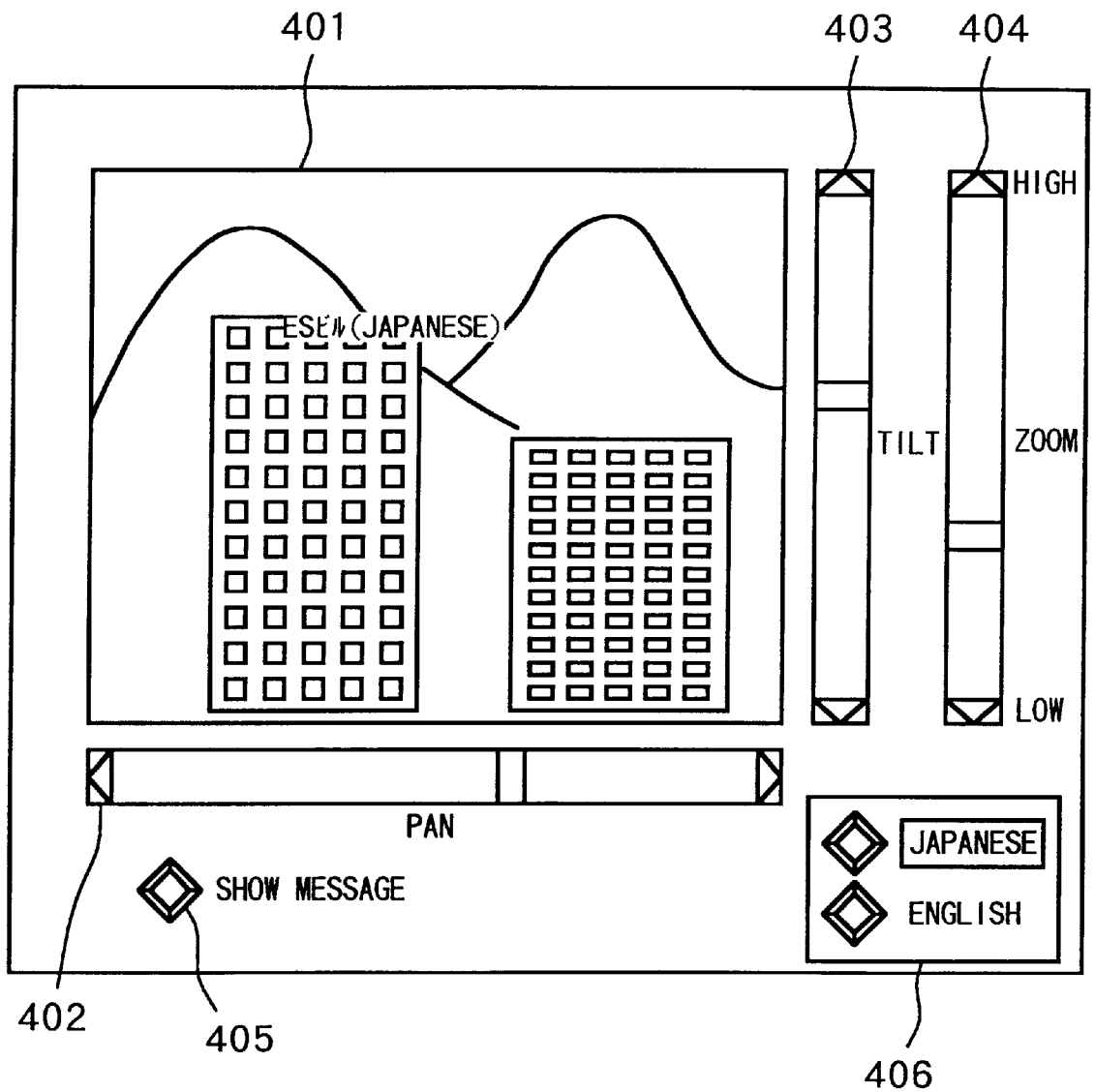
FIG. 30 is a display example upon operation of a sixth embodiment.

At step S1303, in addition to the display example in FIG. 28, a panel 406 as shown in FIG. 30 is formed to select "display a message in Japanese or English".

At step S1305, similar to the fifth embodiment, it is checked whether or not the event of selecting display/not display a message has been made. If this event has been made and "display" has been selected from the "not display", it is further checked whether English or Japanese has been selected by the panel 406. In accordance with the selection by the panel 406, the message display mode is set at step S1306.

At step S1313, it is determined "whether English mode or Japanese mode is currently selected", and a message corresponding to the selection is combine-displayed.

By the above change, the user manually select to display the message in Japanese or English. The present invention is not limited to this arrangement, but also includes cases, "one from three or more languages is selected", "a message for children or a message for adults is selected", "a message for beginners, middle-class learners or advanced learners is selected", and the like.

Further, the present invention also includes cases, "display format is selected, i.e., whether an annotation on a predetermined displayed object is displayed in form of an image or in characters is selected" and "outputting an annotation in audio message or in characters is selected". That is, according to the present embodiment, the format to output an annotation on a predetermined object in the video image can be selected, in accordance with image-sensing condition for image sensing a video image from a camera or condition for displaying the video image on the display 110.

Seventh Embodiment

Next, a seventh embodiment where character information is overlaid on a video image obtained from a remote camera server and the image is displayed, similar to the fifth embodiment, will be described with reference to FIG. 31.

The difference from the fifth embodiment is that when a user performs click operation or the like with respect to the video-image display area 401, the display image automatically changes to another home page (specifically, in a case where an annotation on an object is a unique name, and the home page is presented on the Internet by a party or the like having the unique name).

In the present embodiment, when an annotation in the video-image display area 401 (e.g., "E S Building") is clicked, a home page on the Internet presented by "E S Building" is displayed in the video-image display area 401.

To realize the present embodiment, modification is made to the fifth embodiment as follows.

First, the text information stored in the server controller 102 is changed as follows:

<applet code=webview width=400 height=300>
<param name=messageJ1 value="E S

```
<applet code=webview width=400 height=300>
<param name=messageJ1   value="E S ビル">
<param name=messageE1   value="E S Building">
```

-continued

```
<param name=panRange1  value="–100,100">
<param name=tiltRange1  value="0,100">
<param name=zoomRange1  value="1.0,1.2">
<param name=locate1  value="0,0">
<param name=nextlink1  value="http://www.es.com/">
```

">
  <param name-messageE1 value="E S Building">
  <param name=panRange1 value="–100,100">
  <param name=tiltRange1 value="0,100">
  <param name=zoomRange1 value="1.0,1.2">
  <param name=locate1 value="0,0">
  <param name=nextlink1 value="http://www.es.com/">

Figure 31:
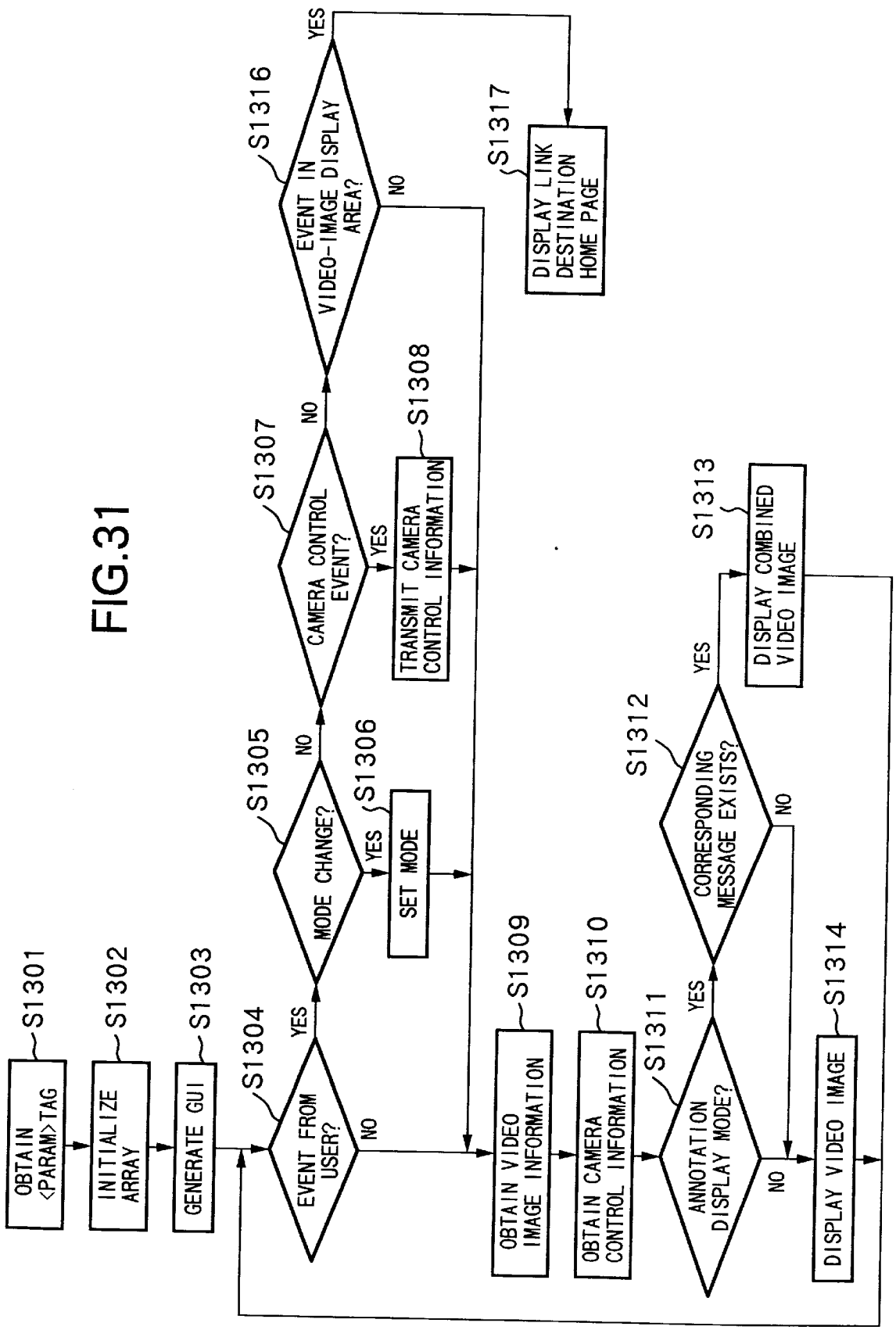
FIG. 31 is a flowchart showing a process procedure according to a seventh embodiment.

As the text information obtained from the server controller 102 in the description of the fifth embodiment is changed, at step S1301 in FIG. 31, a routine to obtain the next link is added to the routine obtaining the <param> tag. Specifically, the following instruction is added to the routine. In FIG. 31, steps identical to those in FIG. 27 have the same reference numerals, and the steps different from those in FIG. 27 will be described in detail. The instruction is:

link=getParameter("nextlink1");

The address of the home page as the next link, i.e., "http://www.es.com" is stored at the variable "link".

Further, at step S1302 in FIG. 31, arrays for storing the next link are added.

Further, at step S1307 in FIG. 31, it is checked whether the event made by the user is "camera control event". If it is not the "camera control event", it is checked whether or not the event is "event on the video-image display area". Note that processings other than steps S1316 and S1317 are the same as those in the fifth embodiment.

If it is determined at step S1316 that the event is not "event to click on the video-image display area", the process proceeds to step S1309.

If it is determined at step S1316 that the event is the "event to click on the video-image display area", first, at the video-image display area 401, X and Y coordinates at a position clicked by the pointing device (mouse) are obtained.

If the coordinates are within a distance from the displayed message, the process proceeds to step S1317, at which a home page having an address corresponding to the message stored at step S1302 is received and displayed. Note that the coordinates of the message can be obtained in accordance with the procedure described in the fifth embodiment.

If it is determined at step S1316 that the event is the "even to click on the video-image display area" but the coordinates of the clicked position is not within the distance from the displayed message, the process proceeds to step S1309.

By the above operation, when a message is displayed in the video-image display area 401, if a position around the message is clicked by the mouse, a home page associated with the message is newly displayed. Accordingly, a home page, which relates to an object, which attracts the user, in a video image realtimely obtained by the camera, is quickly displayed, thus an image display apparatus with excellent operability can be provided.

Note that the annotations or messages in the fifth to seventh embodiments are not limited to explanations of respective objects, but may be messages from people relating to the respective objects, E-mail addresses or addresses on the Internet relating to the respective objects, information on the sites where the objects actually exist, variable information on the respective objects, and the like.

For example, if the video-image display area 401 shows a sky as an object, weather information (variable information) may be the annotation on this object. Further, if the object is a company building or the like, a message from the company, a company name, the company's address or the like may be the annotation on the object. Further, if the object is a residential section, the address of the residential section may be the annotation on the object.

As described above, according to the fifth to seventh embodiments, as well as a video image provided from a camera server, a message relating to the video image can be appropriately combined with the video image in accordance with image-sensing condition of the camera or display condition, and the combined image is displayed.

Further, as the user can select to combine a message with the video image and display the combined image or not, it is possible to combine a message in accordance with the user's preference.

Further, by preparing a plural formats of messages with respect to one object, an appropriate message can be selected in accordance with various requirements from the user.

Further, when a message combined with a displayed object is clicked, a home page of an address relating to the message can be displayed. Therefore, if there is a message such as company name in the video-image display area 401, a link to the company's home page can be embedded there, thus an image display apparatus with excellent operability can be provided.

Further, when receiving and displaying a video image, whether or not an additional image (the message or annotation in the present embodiment) is combined with the video image can be selected in accordance with the zoom ratio in image sensing the image. Thus, additional information relating to the displayed video image can be combine-displayed in a state appropriate to various situations.

Specifically, in accordance with the zoom ratio in image sensing the video image, additional information relating to the object in the video image can be combine-displayed. Further, as the display format of the additional information can be selected, the additional information can be combine-display in accordance with the user's preference.

Further, as additional information to be combine-displayed is a link image to start to receive an image from another network terminal, video image display with excellent operability can be performed.

Note that the present invention can be applied to a system constituted by a plurality of devices (e.g., host computer, interface, reader, printer) or to an apparatus comprising a single device (e.g., copy machine, facsimile apparatus).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A video-image control apparatus having video-image input means, which transfers a video image from a predetermined camera device, inputted in accordance with a request from a remote client, to the client comprising:
   storage means for pre-storing position data of an object and identification information identifying an apparatus which supplies information related to the object;
   request means for requesting information relating an object to the apparatus by using identification information stored in said storage means if the object is in the video image inputted by said video-image means; and
   transfer means for transferring the video-image and information related to the object obtained by said request means to the client, wherein the object is an information processing device or system which transfers status information upon issuance of status-information acquisition request via a predetermined communication means.

2. The video-image control apparatus according to claim 1, further comprising:
   generating means for generating an additional image based on information related to the object in the video image inputted by said video-image input means; and
   combining means for combining the additional image generated by said generating means, with the video image inputted by said video-image input means;
   wherein said generating means has determination means for determining whether or not the video image inputted by said video-image input means includes the object, based on position data stored in said storage means,
   and wherein if said determination means determines that the video image includes the object, said generating means generates the additional image.

3. The video-image control apparatus according to claim 1, wherein said generating means has:
   determination means for determining whether or not the video image inputted by said video-image input means includes the object; and
   status-information reception means for issuing a status-information acquisition request to the object if said determination means determines that the video image includes the object, and receiving status information from the object,
   and wherein said generating means generates the additional image based on the status information received by said status-information reception means.

4. The apparatus according to claim 1, wherein said object is a device having a network interface.

5. A control method for a video-image control apparatus having video-image input means, which transfers a video image, inputted in accordance with a request from a remote client, to the client comprising:
   a storage step for pre-storing position data of an object and identification information identifying an apparatus which supplies information related to the object;
   a request step for requesting information relating an object to the apparatus by using identification information stored in said storage step if the object is in the video image inputted by said video-image means; and
   a transfer step for transferring the video-image and information related to the object obtained by said request step to the client,
   wherein the object corresponding to the pre-stored information is an information processing device or system which transfers status information upon issuance of status-information acquisition request via a predetermined communication means.

6. The control method according to claim 5, wherein said video-image input means inputs the video image from a predetermined camera device.

7. The control method according to claim 5, further comprising:
   a generating step for generating an additional image based on information related to the object in the video image inputted by said video-image input means; and
   combining step for combining the additional image generated by said generating step, with the video image inputted by said video-image input means;
   wherein said generating step has a determination step of determining whether or not the video image inputted by said video-image input means includes the object, based on position data stored in said storage step,
   and wherein if it is determined at said determination step that the video image includes the object, the additional image is generated at said generating step.

8. The control method according to claim 5, wherein said generating step has:
   a determination step of determining whether or not the video image inputted by said video-image input means includes the object; and
   a status-information reception step of issuing a status-information acquisition request to the object if it is determined at said determination step that the video image includes the object, and receiving status information from the object,
   and wherein the additional image is generated at said generating step based on the status information received by said status-information reception means.

9. The apparatus according to claim 5, wherein said object is a device having a network interface.

10. A storage medium containing a program which functions as a video-image control apparatus having video-image input means, which transfers a video image, inputted in accordance with a request from a remote client, to the client comprising:
    storage means for pre-storing position data of an object and identification information identifying an apparatus which supplies information related to the object;
    request means for requesting information relating an object to the apparatus by using identification information stored in said storage means if the object is in the video image inputted by said video-image input means; and a transfer means for transferring the video-image and information related to the object obtained by said request means to the client, wherein the object corresponding, to the pre-stored information is an information processing device or system which transfers status information upon issuance of status-information acquisition request via a predetermined communication means.

11. The apparatus according to claim 10, wherein said object is a device having a network interface.

* * * * *

UNITED STATES PATENT AND TRADEMARK OFFICE
CERTIFICATE OF CORRECTION

PATENT NO. : 6,654,060 B1
DATED : November 25, 2003
INVENTOR(S) : Kurosawa et al.

It is certified that error appears in the above-identified patent and that said Letters Patent is hereby corrected as shown below:

Column 5,
Line 56, delete "by, the above search" insert -- by the above search --

Column 7,
Line 9, delete "smoothly provides" and insert -- smoothly provide --

Column 10,
Line 47, delete "initial value >, dowmto<end" insert -- intial value>, down to < end --
Line 48, delete "value>dowm<increment>" insert -- value>, down< increment> --

Column 11,
Line 15, delete ""R" is as the" and insert -- "R" "$", as the --
Line 20, delete "$("and ends with") ")" and insert -- "$ ("and ends with")" --

Column 18,
Line 64, delete "been pressed:" and insert -- been pressed. --

Column 21,
Line 1, delete "Korosawa" and insert -- Kurosawa --

Column 27,
Line 41, delete "http;://www.foo.co.jp" and insert -- http://www.foo.co.jp --

Column 33,
Line 30, delete "at tends of frames/second." and insert -- at tens of frames/second. --

Column 34,
Line 10, delete "(pan Range Max + pam Range Min)" and insert -- pan Range Max + pan Range Min) --
Line 17, delete "y1-tilt Value tiltvalue" and insert -- y1-tilt Value tilt Value --

Colulmn 35,
Line 37, after "construction." begin a new paragraph -- To realization --
Line 43, insert at the end of the line -- "> --
Delete lines 45-54.

UNITED STATES PATENT AND TRADEMARK OFFICE
CERTIFICATE OF CORRECTION

PATENT NO. : 6,654,060 B1
DATED : November 25, 2003
INVENTOR(S) : Kurosawa et al.

It is certified that error appears in the above-identified patent and that said Letters Patent is hereby corrected as shown below:

Column 36,
Line 61, insert at the end of the line -- ">" --
Delete lines 62-64.

Column 37,
Delete lines 1-9.

Column 41,
Line 4, delete "corresponding, to the prestored" and insert -- corresponding to the prestored --

Signed and Sealed this

Twenty-fourth Day of May, 2005

JON W. DUDAS
*Director of the United States Patent and Trademark Office*